United States Patent
Neway

(12) 
(10) Patent No.: US 9,275,367 B2
(45) Date of Patent: Mar. 1, 2016

(54) SYSTEM FOR DESIGNATING, DISPLAYING AND SELECTING TYPES OF PROCESS PARAMETERS AND PRODUCT OUTCOME PARAMETERS

(75) Inventor: Justin Neway, Longmont, CO (US)

(73) Assignee: AEGIS ANALYTICAL CORPORATION, Layfayette, CO (US)

(*) Notice: Subject to any disclaimer, the term of this patent is extended or adjusted under 35 U.S.C. 154(b) by 40 days.

(21) Appl. No.: 13/464,199

(22) Filed: May 4, 2012

(65) Prior Publication Data

US 2012/0281012 A1 Nov. 8, 2012

Related U.S. Application Data

(60) Provisional application No. 61/482,708, filed on May 5, 2011, provisional application No. 61/488,202, filed on May 20, 2011.

(51) Int. Cl.
G09G 5/00 (2006.01)
G06Q 10/10 (2012.01)

(52) U.S. Cl.
CPC ............... *G06Q 10/10* (2013.01); *G09G 5/00* (2013.01); *G09G 2340/14* (2013.01)

(58) Field of Classification Search
CPC ... G06T 11/206; G06F 3/0481; G06F 17/246; H04L 12/2458; G06Q 10/10
USPC ........................ 345/440, 619, 629; 715/215
See application file for complete search history.

(56) References Cited

U.S. PATENT DOCUMENTS

| | | | |
|---|---|---|---|
| 5,014,208 A | 5/1991 | Wolfson | |
| 5,841,660 A | 11/1998 | Chaudhry et al. | |
| 6,600,963 B1 * | 7/2003 | Loise et al. | 700/81 |
| 6,725,230 B2 | 4/2004 | Ruth et al. | |
| 6,741,998 B2 | 5/2004 | Ruth et al. | |
| 7,671,868 B2 | 3/2010 | Morita et al. | |
| 8,170,903 B2 * | 5/2012 | Poissant | 705/7.28 |
| 8,326,806 B1 * | 12/2012 | Baratloo et al. | 707/688 |
| 2003/0135786 A1 * | 7/2003 | Vollmar et al. | 714/25 |
| 2003/0176774 A1 | 9/2003 | Hickle et al. | |
| 2004/0252128 A1 | 12/2004 | Hao et al. | |
| 2005/0160013 A1 | 7/2005 | Schechinger et al. | |
| 2006/0026453 A1 * | 2/2006 | Frost et al. | 714/4 |
| 2006/0036476 A1 * | 2/2006 | Klem | 705/7 |

(Continued)

FOREIGN PATENT DOCUMENTS

JP H11-045276 2/1999
JP 2004-504661 A 2/2004

(Continued)

OTHER PUBLICATIONS

PCT International Search Report and Written Opinion received in PCT/US2012/036545.

(Continued)

*Primary Examiner* — Todd Buttram
(74) *Attorney, Agent, or Firm* — McDermott Will & Emery LLP

(57) ABSTRACT

Described is the display on a visual display device of one or more first visual indicators that indicate that one or more first process parameters of a process are critical process parameters. The critical process parameters are displayed on the visual display device as part of a hierarchical data structure.

18 Claims, 28 Drawing Sheets

(56) References Cited

U.S. PATENT DOCUMENTS

| | | | |
|---|---|---|---|
| 2007/0050070 A1 | 3/2007 | Strain et al. | |
| 2007/0192715 A1* | 8/2007 | Kataria et al. | 715/764 |
| 2008/0059967 A1* | 3/2008 | Matsui et al. | 718/102 |
| 2009/0164933 A1* | 6/2009 | Pederson et al. | 715/772 |
| 2010/0047745 A1* | 2/2010 | Bergqwist et al. | 434/127 |
| 2012/0041775 A1* | 2/2012 | Cosentino et al. | 705/2 |

FOREIGN PATENT DOCUMENTS

| | | |
|---|---|---|
| JP | 2005-346444 A | 12/2005 |
| JP | 2007-048291 A | 2/2007 |
| JP | 2008-210386 A | 9/2008 |
| WO | 0118736 A1 | 3/2001 |
| WO | 03023687 A2 | 3/2003 |

OTHER PUBLICATIONS

Neway J O: "The Application of Manufacturing Informatics to Bioprocess Yield Improvement"; Society for Industrial Microbiology News, vol. 49, No. 2, Mar. 1999-Apr. 1999 pp. 61-68, XP002314541.

Neway et al.; "Manufacturing useful data"; Inform Assoc. Inf & Image Manag. Int USA, vol. 12, No. 3, Mar. 1998, pp. 28-29, XP0023131469.

Glaser V: "Corporate profile" viol. 18, No. 20, Nov. 15, 1998, XP009042236, pp. 16, 40, 50.

Lee F. et al.: "Yield analysis and data management using Yield Manager <TM>", Sep. 23, 1998, Advanced Semiconductor Manufacturing Conference and Workshop, 1998 IEEE/Semi Boston, MA, USAA IEEE; XP010314089.

Miller W.H. Jr., et al.: "Advanced CIM environment for manufacturing data analysis"; Sep. 30, 1992; Proceedings of the Advanced Semiconductor Manufacturing Conference and Workshop; pp. 19-24, XP010066375.

Kent W.; "A Simple Guide to Five Normal Forms in Relational Database Theory"; Communications of the Association for Computing Machinery, Association for Machiner, NY, US, vol. 26, No. 2, Feb. 1983; pp. 120-125, XP000719788.

International Preliminary Report on Patentability issued in corresponding International (PCT) Application No. PCT/US2012/036545 on Nov. 5, 2013 (6 pages).

Extended Search Report received in European Application No. 12779719.9 dated Sep. 24, 2014.

Office Action received in Canadian Application No. 2,835,196, mailed Mar. 21, 2015.

Hajime Makabe, new edition Introduction to Reliability Engineering, Japan, foundational juridical person Japanese Standards Association, Jul. 8, 2010, $3^{rd}$ edition, pp. 129-138, 203-212.

Robin E. McDermott et al., translated by Hiroshi Harada, Basis of FMEA $2^{nd}$ editino, —Failure Mode Influence Analysis—, Japan foundational juridicial person Japanese Standards Association, Masami Tanaka, Sep. 22, 2010, $2^{nd}$ edition, pp. 28-47.

Canadian Office Action, Canadian Application No. 2,835,196, mailed Nov. 24, 2015, 7 pgs.

\* cited by examiner

402

| Key Attribute / Quality Attribute | Rank / Blend Uniformity (7) | Stratified Tablet Content Uniformity (7) | Impurity Profile (7) | Score | Exp't Strategy |
|---|---|---|---|---|---|
| Dispense and Pre-Blend (Focus Area #1) | | | | | |
| API Particle Size | 10 | 5 | 1 | 112 | OFAAT** |
| Agglomeration of API | 10 | 5 | 1 | 112 | OFAAT |
| Container Loading (% fill) | 10 | 5 | 1 | 112 | DoE |
| Order of API Addition | 10 | 5 | 1 | 112 | DoE |
| Impurity Levels in Excipients | 1 | 1 | 10 | 84 | DoE/FMEA* |
| API Impurity Profile | 1 | 1 | 10 | 84 | OFAAT |
| API Milling Procedure | 5 | 1 | 5 | 77 | OFAAT |
| Blend Time | 5 | 1 | 1 | 49 | DoE |
| Sampling Procedure | 1 | 1 | 1 | 21 | FMEA |
| RC/Mill and Blend (Focus Area #5) | | | | | |
| Roll Force | 10 | 10 | 1 | 147 | DoE |
| Screen Size | 10 | 5 | 1 | 112 | DoE |
| Gap Width | 10 | 5 | 1 | 112 | DoE |
| Roll Speed | 5 | 1 | 1 | 49 | DoE |
| Granulator Speed | 5 | 1 | 1 | 49 | DoE |

**OFAAT – One Factor At A Time
*Failure Mode Effects Analysis

Chemistry, Manufacturing & Controls Submission

IV.  MANUFACTURE (S.2) ...........................................................................8
  A. Manufacturers (S.2.1) ......................................................................8
  B. Description of Manufacturing Process and Process Controls (S.2.2) ........9
    *1. Flow Diagram* .............................................................................*9*
    *2. Description of the Manufacturing Process and Process Controls* ...........*10*
    *3. Reprocessing, Reworking, Recycling, Regeneration, and Other Operations* .......*13*
  C. Control of Materials (S.2.3) ...............................................................16
    *1. Starting Materials* .......................................................................*16*
    *2. Reagents, Solvents, and Auxiliary Materials* ...................................*17*
    *3. Diluents* ...................................................................................*17*
  D. Controls of Critical Steps and Intermediates (S.2.4) ...............................18
  E. Process Validation and/or Evaluation (S.2.5) ........................................20
  F. Manufacturing Process Development (S.2.6) .......................................21
V.  CHARACTERIZATION (S.3) .................................................................21
  A. Elucidation of Structure and Other Characteristics (S.3.1) .....................21
    *1. Elucidation of Structure* ..............................................................*21*
    *2. Physicochemical Characterization* ................................................*22*
    *3. Biological and Other Relevant Characteristics* .................................*23*
  B. Impurities (S.3.2) ............................................................................23

| Key Attribute | Y | Y | Y | | |
|---|---|---|---|---|---|
| Rank | 7 | 7 | 7 | Score | Exp't Strategy |
| Quality Attribute | Endotoxin | Potency | Contaminant A | | |
| Clarification (Focus Area #1) | | | | | |
| Hold Time | 10 | 5 | 1 | 112 | OFAAT** |
| Feed Flow Rate | 10 | 5 | 1 | 112 | OFAAT |
| Pump Speed | 10 | 5 | 1 | 112 | DoE |
| Initial pH | 10 | 5 | 1 | 112 | DoE |
| Concentrate Flow Rate | 1 | 1 | 10 | 84 | DoE/FMEA* |
| Concentrate OD | 1 | 1 | 10 | 84 | OFAAT |
| Adjusted pH | 5 | 1 | 5 | 77 | OFAAT |
| Amount of Base Added | 5 | 1 | 1 | 49 | DoE |
| Concentrate Back Pressure | 1 | 1 | 1 | 21 | FMEA |
| Column A (Focus Area #5) | | | | | |
| Load Conductivity | 10 | 10 | 1 | 147 | DoE |
| Step Yield | 10 | 5 | 1 | 112 | DoE |
| Repack Date | 10 | 5 | 1 | 112 | DoE |
| Load Volume | 5 | 1 | 1 | 49 | DoE |
| Load Temperature | 5 | 1 | 1 | 49 | DoE |

**OFAAT – One Factor At A Time
*Failure Mode Effects Analysis

Chemistry, Manufacturing & Controls Submission

IV. MANUFACTURE (S.2) .................................................................................8
  A. Manufacturers (S.2.1) ..........................................................................8
  B. Description of Manufacturing Process and Process Controls (S.2.2) ........9
    *1. Flow Diagram* .................................................................................*9*
    *2. Description of the Manufacturing Process and Process Controls* ..........*10*
    *3. Reprocessing, Reworking, Recycling, Regeneration, and Other Operations* .......*13*
  C. Control of Materials (S.2.3) ...............................................................16
    *1. Starting Materials* ..........................................................................*16*
    *2. Reagents, Solvents, and Auxiliary Materials* ....................................*17*
    *3. Diluents* ........................................................................................*17*
  D. Controls of Critical Steps and Intermediates (S.2.4)............................18
  E. Process Validation and/or Evaluation (S.2.5) .......................................20
  F. Manufacturing Process Development (S.2.6) .......................................21
V. CHARACTERIZATION (S.3) ........................................................................21
  A. Elucidation of Structure and Other Characteristics (S.3.1) ..................21
    *1. Elucidation of Structure*..................................................................*21*
    *2. Physicochemical Characterization* ..................................................*22*
    *3. Biological and Other Relevant Characteristics*..................................*23*
  B. Impurities (S.3.2) ...............................................................................23

FIG.27

SYSTEM FOR DESIGNATING, DISPLAYING AND SELECTING TYPES OF PROCESS PARAMETERS AND PRODUCT OUTCOME PARAMETERS

CROSS-REFERENCE TO RELATED APPLICATIONS

This application claims benefit of priority to U.S. Provisional Patent Application No. 61/482,708, entitled "A SYSTEM FOR DESIGNATING, DISPLAYING AND SELECTING TYPES OF PROCESS PARAMETERS AND PRODUCT OUTCOME PARAMETERS" filed May 5, 2011 and U.S. Provisional Patent Application No. 61/488,202, entitled "THE ROLE OF DISCOVERANT IN QbD" filed May 20, 2011, the contents and disclosures of which are incorporated herein by reference in their entirety.

BACKGROUND

1. Field of the Invention

The present invention relates to quality control methods.

2. Related Art

It has been difficult to implement quality by design methods in pharmaceutical manufacturing processes.

SUMMARY

According to a first broad aspect, the present invention provides a method comprising the following steps: (a) displaying on a visual display device one or more first visual indicators that indicate that one or more first process parameters of a process are critical process parameters, wherein the critical process parameters are displayed on the visual display device as part of a hierarchical data structure.

According to a second broad aspect, the present invention provides a computer-readable storage medium encoded with a plurality of computer-executable instructions that, when executed, perform a method comprising the following steps: (a) displaying on a visual display device one or more first visual indicators that indicate that one or more first process parameters of a process are critical process parameters, wherein the critical process parameters are displayed on the visual display device as part of a hierarchical data structure.

BRIEF DESCRIPTION OF THE DRAWINGS

The accompanying drawings, which are incorporated herein and constitute part of this specification, illustrate exemplary embodiments of the invention and, together with the general description given above and the detailed description given below, serve to explain the features of the invention.

FIG. 4 is a cause-and-effect matrix for part of the manufacturing process of FIG. 2.

FIG. 14 shows a table of contents for a CMC submission for the pharmaceutical product manufactured by the manufacturing process of FIG. 2 that may be generated using a process intelligence software platform according to one embodiment of the present invention.

FIG. 17 is a cause-and-effect matrix for part of the manufacturing process of FIG. 15.

FIG. 27 shows a table of contents for a CMC submission for the pharmaceutical product manufactured by the manufacturing process of FIG. 15 that may be generated using a process intelligence software platform according to one embodiment of the present invention.

DETAILED DESCRIPTION OF THE PREFERRED EMBODIMENTS

Definitions

Figure 1:
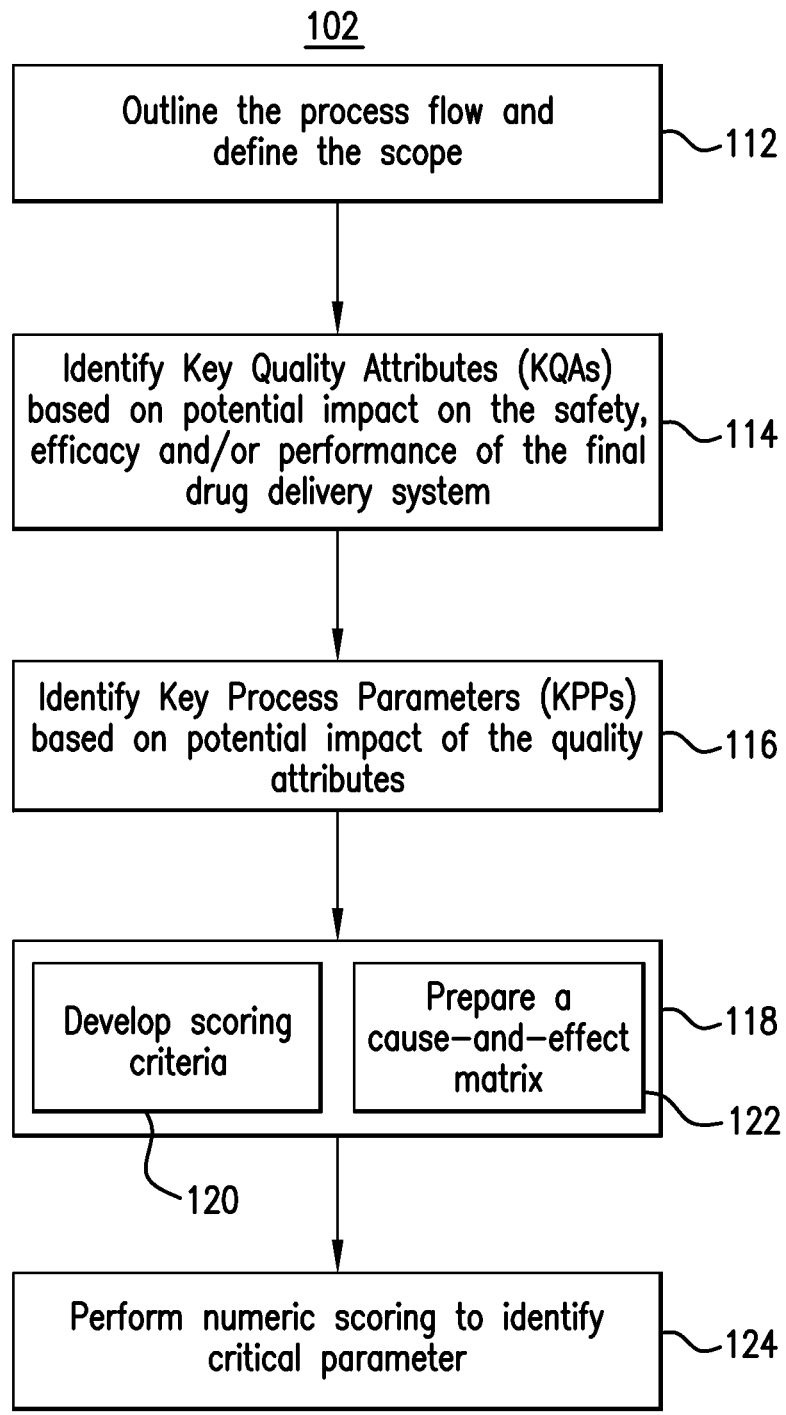
FIG. 1 is a flowchart showing the steps in a risk assessment method that may be used in one embodiment of the present invention.

Where the definition of a term departs from the commonly used meaning of the term, applicant intends to utilize the definitions provided below, unless specifically indicated.

For purposes of the present invention, it should be noted that the singular forms, "a," "an" and "the," include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc., are used merely for convenience in describing the various embodiments of the present invention. The embodiments of the present invention may be oriented in various ways. For example, the diagrams, apparatuses, etc., shown in the drawing figures may be flipped over, rotated by 90° in any direction, reversed, etc.

For purposes of the present invention, a value or property is "based" on a particular value, property, the satisfaction of a condition or other factor if that value is derived by performing a mathematical calculation or logical decision using that value, property or other factor.

For purposes of the present invention, the term "analysis group" is a collection of data sets that may be selected by a user wherein all the data sets meet the "data restrictions" for one or more data values. For example, an analysis group could include all the data sets that have median temperature values of 35 to 38° C. for three different time points, a minimum pH value above 7, the same raw material supplier value, a raw material supplied date value of January, etc. An analysis group is a structured data container that supports fast, efficient utilization of data via standardized interfaces. The structure of an analysis group permits it to hold all types of data concurrently, e.g., discrete, continuous, replicate, etc. An analysis group can be thought of as a sparsely populated multidimensional data cube, with data sets (that relate to individual batches of manufactured product) making up one axis, data names making up another axis, time offsets (for continuous data) making up another axis, and replicate information making up another axis. Analysis groups also allow the dynamic creation of additional data within the analysis groups, allow for the data within them to be subsetted for subsequent operations and allow themselves to be updated with new data from the data sources on an on-demand basis.

For purposes of the present invention, the term "batch" refers to a given amount of product and the materials and conditions used to make that given amount of product. Several types of discrete data, continuous data and replicate data may all be related to a particular batch of product.

For purposes of the present invention, the term "blend uniformity" refers to how evenly the pharmaceutically active component of the mixture is distributed throughout the blend. Blend uniformity may be determined by measuring the ratio of active ingredient to total contents (usually as a weight percentage) in several samples taken from randomly distributed locations in the blend.

For purposes of the present invention, the term "chemical composition" refers to any type of chemical composition. A chemical composition may be a pure chemical or a mixture of two or more chemicals. A chemical composition may be a plastic, a pharmaceutical, a food product, etc.

For purposes of the present invention, the term "coded-pair value" refers to a data set or database that contains multiple types of data in a value column, as well a data type identifier column. An example of a coded-pair value database is a database having a column named TYPE and a column named VALUE, with the contents of the TYPE column indicating how to interpret the data instances stored in the VALUE column. Entries in the TYPE column could include TEMP, PH, VISCOSITY, etc. The entries in the VALUE column would be the actual instances of the data values for TEMP, PH or VISCOSITY, etc. A coded pair may include two columns of data or three or more columns of data.

For purposes of the present invention, the term "computer" refers to any type of computer or other device that implements software, including an individual computer such as a personal computer, laptop computer, tablet computer, mainframe computer, mini-computer, etc. A computer also refers to electronic devices such as a smartphone, an eBook reader, a cell phone, a television, a handheld electronic game console, a video game console, a compressed audio or video player such as an MP3 player, a Blu-ray player, a DVD player, a microwave oven, etc. In addition, the term "computer" refers to any type of network of computers, such as a network of computers in a business, a computer bank, the Cloud, the Internet, etc. A computer may include a storage device, memory or other hardware and/or software for loading computer programs or other instructions into the computer. A computer may include a communication unit. The communication unit may allow the computer to connect to other databases and the Internet through an I/O interface. The communication unit may allow the transfer to, as well as reception of data from, other databases. The communication unit may include a modem, an Ethernet card or any similar device that enables the computer system to connect to databases and networks such as LAN, MAN, WAN and the Internet. A computer may facilitate inputs from a user through an input device, accessible to the system through the I/O interface. A computer may execute a set of instructions that are stored in one or more storage devices, in order to process input data. The storage devices may also hold data or other information as desired. The storage element may be in the form of an information source or a physical memory element present in the processing machine. The set of instructions may include various commands that instruct the processing machine to perform specific tasks, such as the steps that constitute the method of the present technique. The set of instructions may be in the form of a software program. Further, the software may be in the form of a collection of separate programs, a program module with a larger program or a portion of a program module, as in the present technique. The software may also include modular programming in the form of object-oriented programming. The processing of input data by the processing machine may be in response to user commands, results of previous processing or a request made by another processing machine.

For purposes of the present invention, the term "continuous data" refers to data values that are obtained at several times during the process of producing a batch of product, with each collection having an associated time. Examples of continuous data include: the temperature at a particular step of a process measured in 5-second intervals for the duration of the step, the moisture content of the effluent air at a particular step measured in 10-second intervals for the duration of the step, the amount of contamination present at a particular step measured in 15-minute intervals, etc.

For purposes of the present invention, the term "critical attribute" refers to a material attribute for an input material for a process that has a risk assessment score that is above a particular threshold that is determined based on prior experience or scientific judgment. A critical attribute is one type of process parameter.

For purposes of the present invention, the term "critical process parameter" refers to a process parameter for one or more processing steps of a process or for a material added to a process that has a risk assessment score that is above a particular threshold that is determined based on prior experience or scientific judgment.

For purposes of the present invention, the term "data leaf" refers to a location within a database or data set that is represented in a hierarchical data structure. A data leaf describes or represents data but is not data per se. For example, a data leaf called "Glucose pH" could represent the data "7.6," the pH of glucose in a process that the present invention is used to analyze.

For purposes of the present invention, the term "data node" refers to a node on a hierarchical data structure that represents a restriction on the data leaves beneath the data node in the hierarchical data structure. Inferior data nodes located directly beneath the superior data node in a hierarchical data structure represent the cumulative restrictions of both the superior data node and the inferior data node.

For purposes of the present invention, the term "data set heading" refers to the heading of a column of data in a data set. Examples of data set headings are batch number, temperature, temperature at given times, test name, humidity, etc.

For purposes of the present invention, the term "data set" refers to a set of data or a database. A data set may be classified into a particular "complete data set type" based on the data set's primary data set type, the secondary data set type and the tertiary data set type.

For purposes of the present invention, the term "data source" refers to any source of data such as database or data storage file, data directly produced by a measurement device, data electronically sent from a remote location, data entered into a database, paper records, etc. Two data sources are considered to be "different" if the data sources employ different file formats or different data structures or if they have different physical locations.

For purposes of the present invention, the term "discrete data" refers to data that is obtained only once during the process of producing one batch of product. Examples of discrete data include: the amount of an ingredient added at some step in a process, the source of an ingredient added at a particular step in a process, the date of production of an ingredient used in a process, etc.

For purposes of the present invention, the term "focus area" refers to a set of one or more process steps that are expected to affect the quality or yield of a product produced by a manufacturing process. In some embodiments of the present invention, a focus area may be selected by a user based on past experience with the manufacturing process. In some embodiments of the present invention, a focus area may be determined by the use of a process intelligence software platform designed to analyze historical data from the manufacturing process.

For purposes of the present invention, the term "hardware and/or software" refers to a device that may be implemented by digital software, digital hardware or a combination of both digital hardware and digital software.

For purposes of the present invention, the term "hierarchical data structure" refers to a tree-like structure into which data available to a user is organized in accordance with one embodiment of the present invention. The hierarchical data structure into which data is organized is generally displayed on a visual display device, such as a computer monitor, and parts of the hierarchical data structure may be expanded or contracted using conventional mouse techniques. The structure of a hierarchical data structure may be based on many different types of things. For example, the structure of a hierarchical data structure organizing data about a manufacturing process may be based on: the organization of the steps of the process, the raw materials used in the process, the equipment used in the process, the facilities or plant locations used in the process, the utilities used in said process, the crews of operators used in said process, etc.

For purposes of the present invention, the term "historical data" refers to data for a manufacturing process stored on a storage medium prior to a risk assessment being performed on the manufacturing process.

For purposes of the present invention, the term "identification code" refers to a value that is associated with all the data in a particular data set that may be used as the primary means of identification for that data set. Typically, an identification code identifies one or more rows of data in a data set or database that is organized by rows. Examples of identification codes include: the manufacturing ID number associated with a data set, a batch number associated with a data set, a lot number associated with a data set, etc. Generally, an identification code is a characteristic that is not a measured property, but is rather a characteristic that is assigned to data and is used only for identification purposes. For use in the method of the present invention, the identification code for a data set may be tagged to the data in the data set from which the data for the data set are obtained or may be manually assigned for a data set. An example of manually assigning the identification code for a data set is when there are paper documents providing information such as batch number, lot number or manufacturing ID number for an identification code for a data set, and data from a data set must have this "manually assigned identification code" applied to the data in the data set prior to employing the method of the present invention on the data set.

For purposes of the present invention, the term "inferior node" refers to a node that is located below another node in a hierarchical data structure. The term "inferior node" is a relative term, and a given node may be inferior to one or more nodes and superior to one or more nodes at the same time.

For purposes of the present invention, the term "input material attribute" refers to any property or characteristic of an input material of a process. The input material may be a raw material, an intermediate material, etc. Examples of input material attributes are "identification codes" and "material attribute values." Any material attribute that is not used as an identification code for an analysis group is a material attribute value. Material attribute values include characteristics such as the particle size of a raw material, the impurity profile of a raw material, the source of a raw material, the content of an intermediate material, etc.

For purposes of the present invention, the term "input" and the term "input material" refer to any material input into a process or input before or during any step of a process. An input material may be a raw material, an intermediate material, etc. The output of one step of a process may be an input to another step of the process.

For purposes of the present invention, the term "intermediate material" refers to a material produced during the process prior to producing the product of the process. An intermediate material may be produced by manufacturing the intermediate material from raw materials or other intermediate materials, by purifying raw materials or other intermediate materials, by the synthesis from raw materials or other intermediate materials, etc.

For purposes of the present invention, the term "Key Process Parameters (KPPs)" refers to process parameters that are of interest for further evaluation or for process monitoring purposes.

For purposes of the present invention, the term "Key Quality Attributes (KQAs)" refers to quality attributes that are of interest for further evaluation or for process monitoring purposes.

For purposes of the present invention, the term "label node" refers to a node in a hierarchical data structure that is used to organize the storing and display of data for a user but that does not represent a restriction on data, a data leaf or a data node. Therefore, the label nodes located above one or more data nodes in a hierarchical data structure may be rearranged, changed, deleted, added to, etc., without affecting the restrictions associated with the data nodes.

For purposes of the present invention, the term "load" refers to one of one or more amounts of raw or intermediate material used in producing one batch of a product.

For purposes of the present invention, the term "machine-readable medium" refers to any mechanism that stores information in a form accessible by a machine such as a computer, network device, personal digital assistant, manufacturing tool, any device with a set of one or more processors, etc. For example, a machine-readable medium may be a recordable/non-recordable medium (e.g., a read-only memory (ROM), a random access memory (RAM), a magnetic disk storage medium, an optical storage medium, a flash memory device, etc.), a bar code, an RFID tag, etc.

For purposes of the present invention, the term "non-replicate data" refers to data values in a data set that are obtained once per run or batch for a particular process parameter or quality attribute, in contrast to replicate data values, which are obtained multiple times per run or batch for a particular parameter or attribute.

For purposes of the present invention, the term "output attribute" refers to an attribute for an output.

For purposes of the present invention, the term "output" refers to any material output of a process or of a process step. An output material may be a finished product, an intermediate material, etc. The output of one step of a process may be an input to another step of the process.

For purposes of the present invention, the term "parameter set" refers to a group of parameters that have the same identification code. A parameter set may be obtained from a single data set or from multiple data sets. A parameter set may have one or more "parameter values" associated with each parameter in the parameter set.

For purposes of the present invention, the term "parameter value" refers to the specific piece of data or the result of a measurement associated with a parameter. Examples of specific parameters include the particular batch number for a parameter, the temperature associated with a parameter at a particular time, the test outcome for a parameter, etc.

For purposes of the present invention, the term "pharmaceutical" refers to a product that is used to treat a disease condition or modify the physical or emotional state of a recipient. A drug is one type of pharmaceutical.

For purposes of the present invention, the term "primary data set type" refers to whether a data set is discrete data, horizontally continuous data or vertically continuous data.

For purposes of the present invention, the term "process parameter" refers to an input material attribute or to a process step parameter.

For purposes of the present invention, the term "process parameter group" refers to a group of process parameters selected by a user in the method of the present invention. In one embodiment of the present invention, a user may set one or more parameter restrictions for one or more of the process parameters in a process parameter group to create an analysis group. In some embodiments of the present invention, an analysis group may include both process parameters and material attributes that are selected based on one or more parameter restrictions.

For purposes of the present invention, the term "process result" and the term "result" refer to a material attribute for an output of a process or a process step.

For purposes of the present invention, the term "process step parameter" refers to a property or characteristic used to classify an individual or multiple pieces of data for a process step. Process step parameters may include characteristics such as the temperature at a particular time for the step, the average temperature for the step, the pH of a solution during the step, the roll force of a mill, the gap width of a mill, the mill screen size, the granulator speed, etc.

For purposes of the present invention, the term "process" refers to any process. The method of the present invention may be to access and analyze processes for producing one or more products, including manufacturing processes, purification processes, chemical synthesis processes, etc., or may be used for other types of processes such as tracking the shipment of goods, tracking inventory in a store, etc. A process of the present invention includes one or more steps. One example of a process according to the present invention is a manufacturing process for a pharmaceutical product.

For purposes of the present invention, the term "quality attribute" refers to an attribute of a material that indicates the quality of the material is produced or output by a process or the step of a process. The produced or output material may be an intermediate material, a final product, etc. Examples of quality attributes include characteristics such as the content of an intermediate material, the content of a final product, the impurity profile for a final product, etc.

For purposes of the present invention, the term "Quality by Design (QbD)" refers to a concept in which control of the quality outcomes of the process is designed into the way the process is operated in such a way that the process is able to cope with a range of expected variations in the process inputs and operating parameters without special intervention or adverse impact on the product's efficacy and safety profile while enhancing product manufacturability.

For purposes of the present invention, the term "raw material" refers to starting materials used in a process for producing a product.

For purposes of the present invention, the term "replicate continuous data" refers to continuous data values obtained by measuring material attributes of multiple loads of material used in a particular batch of a process. An example of replicate continuous data would occur when a drying machine is too small to dry the total quantity of a single production batch in a single step. In this case, the batch would be split into more than one separate drying operation that could be operated sequentially or in parallel, and the "same" continuous material attribute measurements would be made during all three drying operations. In this case, all the continuous parameters associated with the drying step would be measured on each sub-batch and would constitute replicate continuous data for a "single" step. Replicate continuous data are distinguished as vertical or horizontal based on how they are stored in a database. Vertical replicate continuous values are stored in separate rows, and there is a replicate value column to differentiate the replicate data values. These columns would correspond to the sub-batch ID number. Horizontal replicate continuous data refers to replicate continuous data for a parameter or attribute that is stored in a single row.

For purposes of the present invention, the term "replicate data" refers to data values for a parameter or an attribute that are obtained from several measurements of the same parameter or attribute made independently of the time of the measurement; i.e., replicate data includes data obtained from multiple measurements of the same parameter or attribute taken at the same time and data obtained from multiple measurements of the same parameter or attribute taken with no regard as to the time that the measurements were taken. Replicate data may also be discrete data or continuous data.

For purposes of the present invention, the term "replicate discrete data" refers to discrete data obtained by measuring parameters and/or attributes for a single load of material used in a particular batch of a process. An example of replicate discrete data would be the results of powder fineness measurements of a raw material that came from three different suppliers and was added to a single manufactured batch. In this example, there are three measurements made of the "same" raw material. Replicate discrete data are distinguished as vertical or horizontal based on how they are stored in a database. Vertical replicate discrete values are stored in separate rows, and there is a replicate value column to differentiate the replicate parameters and/or attributes. For vertical replicate discrete data, these columns could correspond to the raw material lot ID number or the measurement instance. Horizontal replicate discrete data refers to replicate discrete data for a parameter or attribute that is stored in a single row. This would occur, for example, when three individual particulate surface area measurements are made on portions of the same sample from the same source of final product to minimize the effect of random error.

For purposes of the present invention, the term "risk assessment" refers to a concept in which the likelihood, severity and detectability of an adverse outcome are determined in advance of such adversities actually occurring based on experience and professional judgment.

For purposes of the present invention, the term "secondary data set type" refers to whether a data set contains coded-pair data or simple data.

For purposes of the present invention, the term "simple value" refers to a data set or database in which the columns in the data set or database contain data values matching the column name, e.g., temperature values stored in a column called TEMP.

For purposes of the present invention, the term "software platform" refers a piece of software that works together with one or more other pieces of software in such a way that the one piece of software is able to support the operation of the other pieces of software in a similar way. An example of a software platform is the Discoverant® process intelligence platform from Aegis Analytical Corporation.

For purposes of the present invention, the term "storage" and the term "storage medium" refer to any form of storage that may be used to store bits of information. Examples of storage include both volatile and non-volatile memories such as ERAM, flash memory, floppy disks, Zip™ disks, CD-ROM, CD-R, CD-RW, DVD, DVD-R, DVD+R, hard disks, optical disks, etc.

For purposes of the present invention, the term "stratified product content uniformity" refers to how stratified the pharmaceutically active component of the mixture is throughout the blend. For a tablet, the stratified product content uniformity may be referred to as the stratified tablet uniformity. Stratified product content uniformity for a tablet may be determined by measuring the ratio of active ingredient (usually as a weight percentage) in samples taken from specific locations in the blend, to the total contents in several samples taken from randomly distributed locations in the blend.

For purposes of the present invention, the term "superior node" refers to a node that is located above another node in a hierarchical data structure. The term "superior node" is a relative term, and a given node may be inferior to one or more nodes and superior to one or more nodes at the same time.

For purposes of the present invention, the term "taxonomically related data" refers to data that have the same classification, e.g., discrete/coded-pair/non-replicate or discrete/simple/vertically replicate.

For purposes of the present invention, the term "tertiary data type" refers to whether a data set is non-replicate, horizontally replicate or vertically replicate.

For purposes of the present invention, the term "user" refers not only to end-users of software employing the method of the present invention, but also to individuals, such as software developers or database designers, who carry out one or more steps of the method of the present invention.

For purposes of the present invention, the term "visual display device" or "visual display apparatus" includes any type of visual display device or apparatus such as a CRT monitor, an LCD screen, an LED screen, a projected display, a printer for printing out an image such as a picture and/or text, etc. A visual display device may be a part of another device such as a computer monitor, television, projector, cell phone, smartphone, laptop computer, tablet computer, handheld music and/or video player, personal digital assistant (PDA), handheld game player, head-mounted display, a heads-up display (HUD), global positioning system (GPS) receiver, automotive navigation system, dashboard, watch, microwave oven, electronic organ, automated teller machine (ATM), etc.

DESCRIPTION

In one embodiment, the present invention provides a system for providing "Quality by Design" and other designations and associated visual symbols for process and quality parameters as outlined in the ICH Q8 Pharmaceutical Development guidelines and ICH Q9 Quality Risk Management guidelines and similar documents, aka Parameter Functional Class designations of FE Class designations (ICH is the International Conference on Harmonisation of Technical Requirements for Registration of Pharmaceuticals for Human Use). The designations may be easily seen in any display of process and quality parameters and show where in the process specific classes of parameters are located. This capability also allows users to easily select parameters with a specific type of designation and to perform various types of statistical, visual and other analyses and to prepare reports.

In one embodiment, the present invention also provides the ability to change the designation and the displayed symbol of individual Process and Quality Parameters in response to the outcome of a risk (or impact) analysis based on where in the range of low to high risk (or impact) each parameter falls. In one example of this capability, parameters below a certain threshold level would be designated and shown as "Key" parameters, and above that threshold they would be designated and shown as "Critical" parameters. In one embodiment, a system of the present invention also has the ability to show which of these parameters are controllable and which are not. Prior to the current invention, professionals in this area have not had available to them any means to display risk assessment outcomes using software that also shows the positions of these parameters in a hierarchical view of the process flow, nor had a means to display their controllability at the same time.

FIG. 1 shows a risk assessment method 102 that may be used in one embodiment of the present invention that may be used to analyze a manufacturing process for a pharmaceutical product. In step 112 of risk assessment method 102, a process flow and a scope for the manufacturing process are outlined for risk assessment. The "scope" refers to the areas that will be focused on in risk assessment. In step 114, Key Quality Attributes (KQAs) are identified based on their potential to impact the safety, efficacy and/or performance of the product that is the outcome of the manufacturing process. In step 116, Key Process Parameters (KPPs) are identified based on their potential to impact the quality attributes of the pharmaceutical being manufactured. Step 118 includes two sub-steps: sub-step 120, in which scoring criteria are developed, and sub-step 122, in which a cause-and-effect matrix is prepared. In step 124, numeric scoring is performed to identify critical parameters, i.e., the parameters that have the highest scores are those that present the highest risks.

A version of risk assessment method 102 is provided in the case study described in V. McCurdy, M. T. am Ende, F. R. Busch, J. Mustakis, P. Rose, M. R. Berry, "Quality by Design using an Integrated Active Pharmaceutical Ingredient—Drug Product Approach to Development," *Pharmaceutical Engineering*, Vol. 30, No. 4 (July/August 2010).

Figure 2:
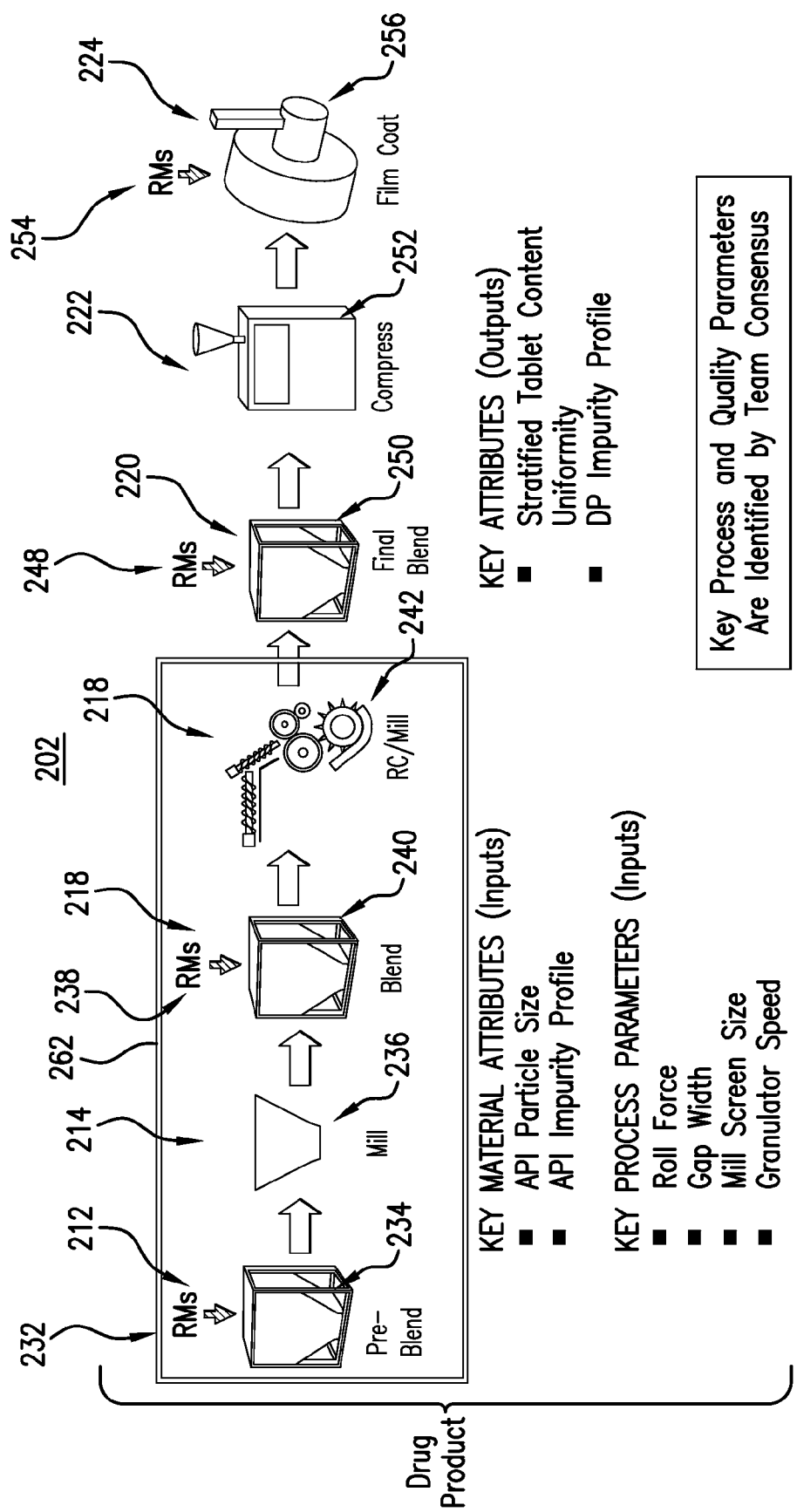
FIG. 2 is a schematic diagram of a manufacturing process for a pharmaceutical product according to one embodiment of the present invention.

FIG. 2 shows a manufacturing process 202 for an exemplary (and fictitious) pharmaceutical product (Memotril 100 mg tablets). Manufacturing process 202 includes in order: a pre-blending step 212, a milling step 214, a blending step 216, a roller compaction and milling step 218, a final blending step 220, a compressing step 222 and a film coating step 224. Raw material stream(s) 232 are fed to blender 234 during pre-blending step 212. Milling step 214 occurs in mill 236. Raw material stream(s) 238 are fed to blender 240 during blending step 216. Roller compaction and milling step 218 occurs in roller compaction and milling apparatus 242. Raw material stream(s) 248 are fed to blender 250 during final blending step 220. Compressing step 222 occurs in compressing apparatus 252. Raw material stream(s) 254 are fed to coating machine 256 during film coating step 224. An analyzed portion 262 of manufacturing process 202 comprises pre-blending step 212, milling step 214, blending step 216 and roller compaction and milling step 218.

The following quality attributes for manufacturing process 202 are identified as material attributes for inputs: the active pharmaceutical ingredient (API) particle size and the API impurity profile. The following process step parameters for manufacturing process 202 are identified as key process parameters for inputs: roll force, gap width, mill screen size and granulator speed. The input material attributes and the process step parameters are the process parameters for manufacturing process 202. The following quality attributes for manufacturing process 202 are identified as key quality attributes for outputs: stratified tablet content uniformity and a drug product (DP) impurity profile.

Figure 3:
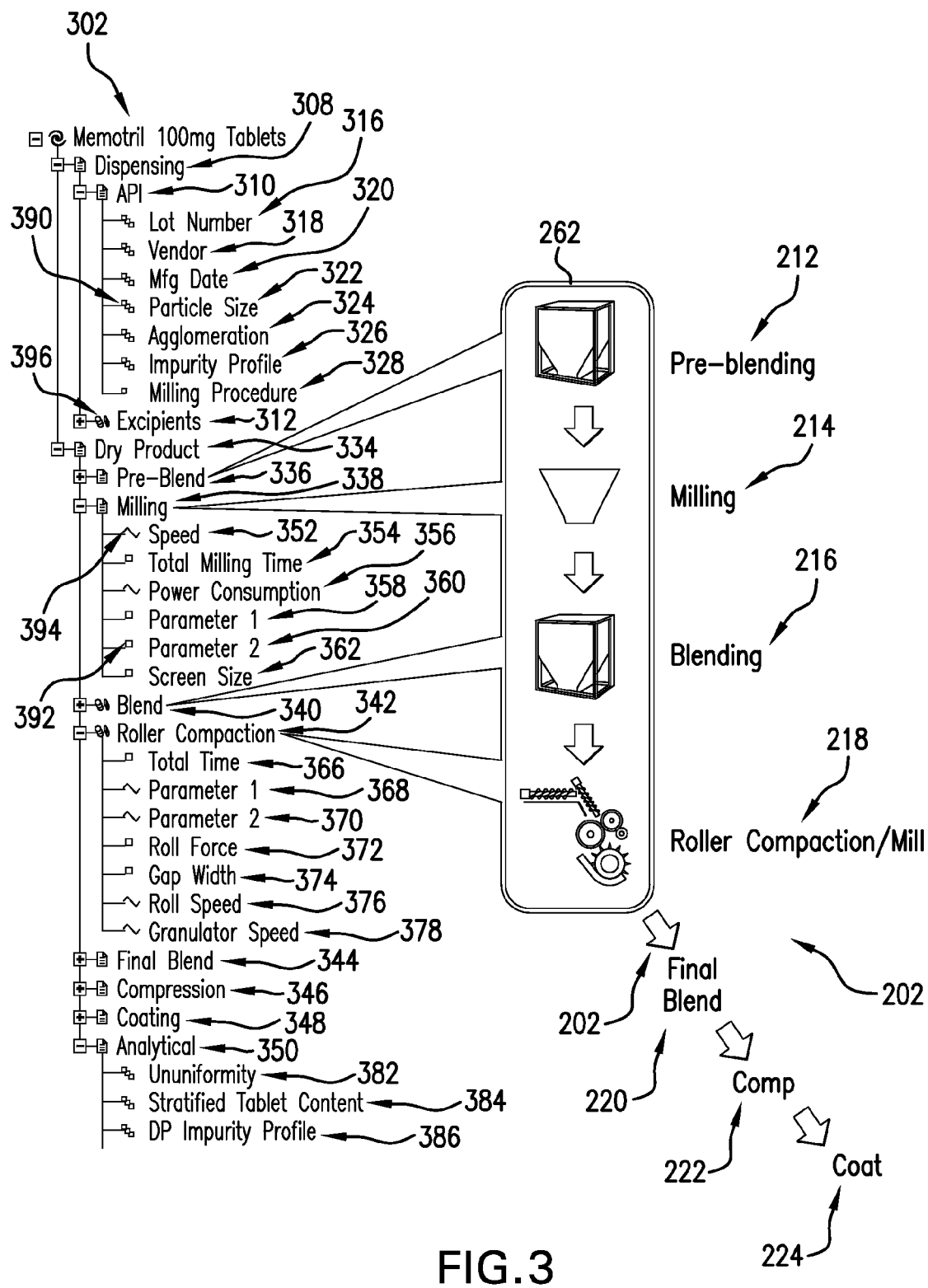
FIG. 3 shows a hierarchical data structure for the manufacturing process of FIG. 2, as depicted in a data analysis program according to one embodiment of the present invention.

FIG. 3 shows the flow of manufacturing process 202 organized in a hierarchical structure 302 by a process intelligence software platform such as Discoverant®. The data leaves that provide access to the data for the raw materials that are fed into manufacturing process 202 in pre-blending step 212 are organized under a data node 308, labeled "Dispensing." Under data node 308 are data node 310, labeled "API," and data node 312, labeled "Excipients." Access points to the data for the quality attributes for API are organized as data leaves under a data node 310. Under data node 310 are data leaf 316 providing access to data for the lot number(s) for the API, data leaf 318 providing access to data for the vendor for the API, data leaf 320 providing access to data for the manufacturing date of the API, data leaf 322 providing access to data for the average particle size of the API, data leaf 324 providing access to data for the degree of agglomeration of the API, data leaf 326 providing access to data for the impurity profile for the API, and data leaf 328 providing access to data from the operation of the milling process. A data node 312 includes data leaves (not shown) providing access to data for excipient materials blending with API during pre-blending step 212.

The access points to data for the process parameters for manufacturing process 202 are organized in data leaves of data nodes under a data node 334 labeled "Dry Product." The data leaves organized in the data nodes under data node 334 also provide access points to data for quality attributes for raw materials fed into manufacturing process 202. Under data node 334 are data nodes 336, 338, 340, 342, 344, 346, 348 and 350. Under data node 336 are data leaves (not shown) providing access to data for pre-blending step 212.

Data for pre-blending step 212 are organized in data leaves (not shown in FIG. 3) under data node 336, which is in turn under data node 334. Data node 336 is shown in an unexpanded state in FIG. 3. Data for milling step 214 are in data leaves under data node 338, which is in turn under data node 334. Under data node 338 is a data leaf 352 providing access to data for the speed of milling for milling step 214, data leaf 354 providing access to data for the total milling time for milling step 214, data leaf 356 providing access to data for the power consumption of the milling machine for milling step 214, data leaf 358 providing access to data for a milling parameter labeled "Parameter 1" for milling step 214, data leaf 360 providing access to data for a milling parameter labeled "Parameter 2" for milling step 214, and data leaf 362 providing access to data for milling screen size for milling step 214. Data for blending step 216 are organized in data leaves (not shown in FIG. 3) under data node 340, which is in turn under data node 334. Data node 340 is shown in an unexpanded state in FIG. 3. Under data node 342 is a data leaf 366 providing access to data for the total time of roller compaction and milling step 218, data leaf 368 providing access to data for a Roller Compaction parameter labeled "Parameter 1", data leaf 370 providing access to data for a Roller Compaction parameter labeled "Parameter 2", data leaf 372 providing access to data for roll force for roller compaction and milling step 218, data leaf 374 providing access to data for gap width for roller compaction and milling step 218, data leaf 376 providing access to data for roll speed for roller compaction and milling step 218, and data leaf 378 providing access to data for granulator speed for roller compaction and milling step 218. Data leaves 368, 370, 376 and 378 provide access to continuous data as indicated by the wave-like symbol for these data leaves. Data leaves 366, 372 and 374 provide access to discrete data as indicated, by the single square symbols for these data leaves.

Data for final blending step 220 are organized in data leaves (not shown in FIG. 3) under data node 344, which is in turn under data node 334. Data node 344 is shown in an unexpanded state in FIG. 3. Data for compressing step 222 are organized in data leaves (not shown in FIG. 3) under data node 348, which is in turn under data node 334. Data node 346 is shown in an unexpanded state in FIG. 3. Data for coating step 224 are organized in data leaves (not shown in FIG. 3) under data node 348, which is in turn under data node 334. Data node 348 is shown in an unexpanded state in FIG. 3.

Access to data for an analysis of the final product of manufacturing process 202 is provided by data leaves 382, 384 and 386 under node 350. Data leaf 382 provides access to data relating to product blend uniformity. Data leaf 384 provides access to data for stratified tablet content uniformity. Data leaf 386 provides access to data for the impurity profile for the pharmaceutical product.

In FIG. 3, data leaves 316, 318, 320, 322, 324, 326, 382, 384 and 386 provide access to replicate data as indicated by multiple square symbol 390 for these data leaves. Data leaves 352, 356, 368, 370, 376 and 378 provides access to continuous data, as indicated by wave-like symbol 392 for these data leaves. Data leaves 328, 354, 358, 360, 362, 366, 372 and 374 provide access to discrete data, as indicated by square symbol 394 for these data leaves. Data nodes 312 and 340, 342 include double symbol 396 indicating these data nodes are associated with meta-data that is used by the query engine to construct the SQL queries that retrieve the data.

In one embodiment of the present invention, quality attributes for manufacturing process 202 are assigned numerical ranks 10, 7, 5 and 1. The criteria for assigning the numerical ranks are provided below:
 10—known or expected direct impact on safety and/or efficacy of product;
 7—unsure or expected impact on product safety or efficacy, or on process efficiency;
 5—unlikely impact on product quality or process efficiency; and
 1—no impact on product quality or process efficiency.
Rankings 10, 7, 5 and 1 are based on the results of manufacturing previous products using manufacturing process 202.

In one embodiment of the present invention, process parameters for manufacturing process 202 are assigned numerical ranks 10, 7, 5 and 1. The criteria for assigning the numerical ranks are provided below:
 10—known or expected strong impact based on data in hand or experience;
 7—unsure but expect a strong relationship;
 5—medium relationship or not sure; and
 1—known there is not a relationship.
Rankings 10, 7, 5 and 1 are based on the results of manufacturing previous products using manufacturing process 202.

FIG. 4 shows an example of a cause-and-effect matrix 402 for an analysis of parameters and attributes for manufacturing process 202. Cause-and-effect matrix 402 has two areas of focus for the following three quality attributes: Blend Uniformity, Stratified Tablet Content Uniformity and Impurity Profile, each of which is assigned a rank of 7. Focus Area #1 relates to dispensing and pre-blending step 212 and includes an analysis of the following process parameters for manufacturing process 202: API particle size, agglomeration of API, container loading (% fill), the order of API addition, the impurity levels in the excipients, the API impurity profile, the API milling procedure, the blend time and the sampling procedure. The process parameters for Focus Area #1 are a mix of process step parameters and input material attributes. Focus Area #5 relates to roller compaction and milling step 218 and to final blending step 220 and includes an analysis of the following attributes for manufacturing process 202: roll force, screen size, gap width, roll speed and granulator speed. The process parameters for Focus Area #5 are all process step parameters.

In cause-and-effect matrix 402, the ranking value for each quality attribute is multiplied by the ranking value for each process parameter to yield a cause-and-effect quality score for each process parameter for each quality attribute. Adding the cause-and-effect quality score for each quality attribute value yields a score. For example, for the process parameter API Particle Size, which is an input material attribute and has a process parameter rank of 7, the cause-and-effect quality score for the quality attribute blend uniformity is 7×10=70, the cause-and-effect quality score for the quality attribute Stratified Table Content Uniformity is 7×5=35, and the cause-and-effect quality score for the quality attribute Parameter Impurity Profile is 7×1=7. Therefore, the total rank score for the process parameter particle size is 70+35+7=112.

Figure 5:
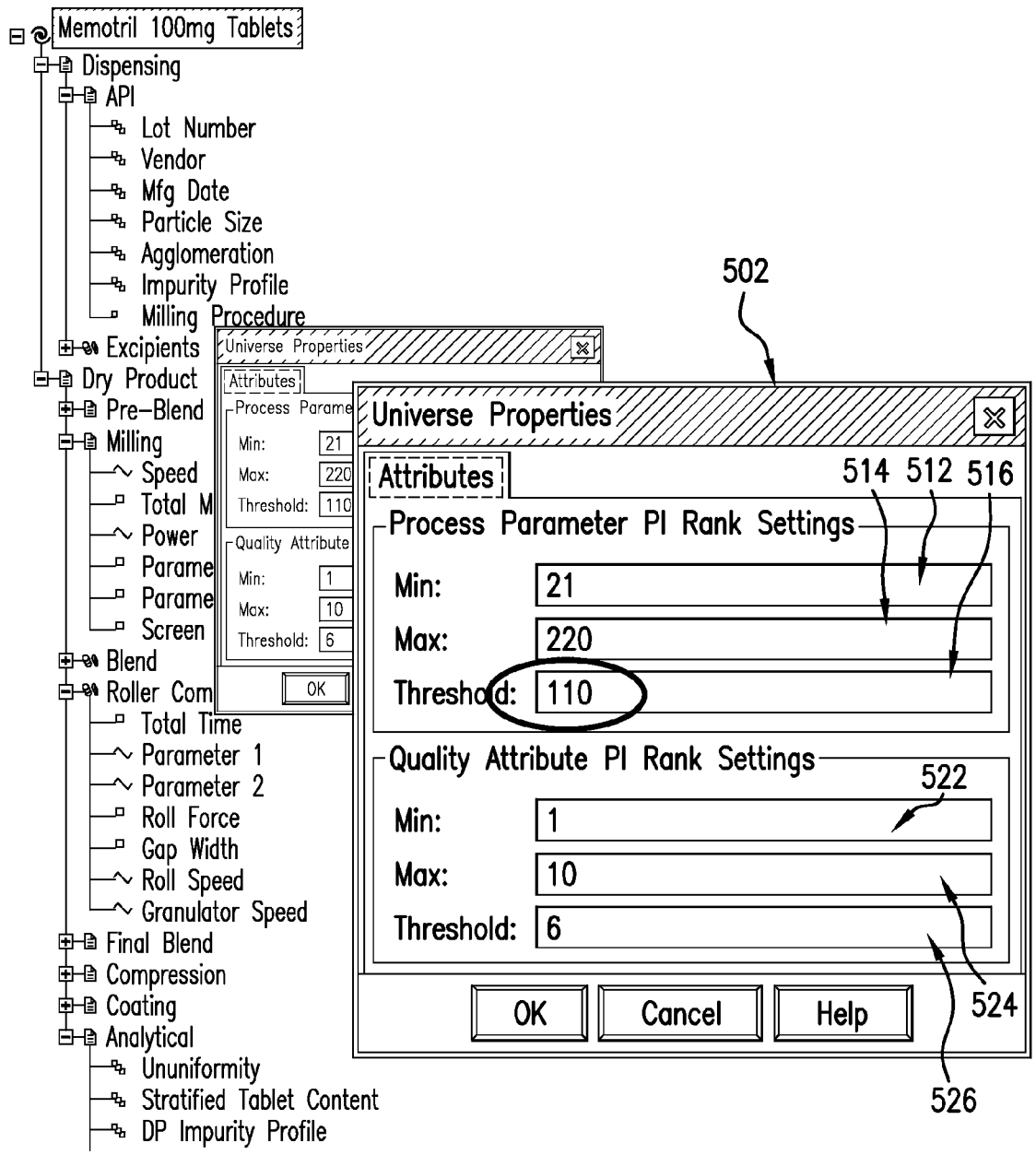
FIG. 5 is a screenshot of a Universe Properties window of a process intelligence software platform used to analyze the manufacturing process of FIG. 2 according to one embodiment of the present invention.

FIG. 5 shows a universe properties window 502 of a data analysis software platform such as Discoverant® that is part of a method for allowing the software platform to display the outcomes of a risk assessment method according to one embodiment of the present invention. Universe properties window 502 includes text boxes 512, 514 and 516 for Process Parameter Process Impact (PI) Rank Settings. Process Parameter PI Rank Settings in the Universe Properties window 502 apply to all process parameters for manufacturing process 202. The value set in text box 512 is the maximum total rank score a process parameter may have. The value set in text box 514 is the minimum total rank score a process parameter may have. The value set in text box 516 is a threshold total rank score for a process parameter that if exceeded will cause the process parameter to be displayed as a Critical Process Parameter by the data analysis software platform. In FIG. 5, the threshold is set to a total rank score of 110, so any process parameter having a total rank score of 110 or greater will be displayed by the data analysis platform as a Critical Process Parameter. The Process Parameter PI Rank Settings apply to all process parameters for manufacturing process 202 that are to be analyzed. As shown in cause-and-effect matrix 402, for manufacturing process 202, the process parameters API particle size, agglomeration of API, container loading (% fill), order of API addition, roll force, screen size and gap width all have scores that exceed this threshold and therefore all three process parameters would be determined by the data analysis software platform to be Critical Process Parameters.

Universe properties window 502 also includes text boxes 522, 524 and 526 for Quality Attribute PI Rank Settings. The value set in text box 522 is the minimum value a quality attribute may have. The value set in text box 524 is the maximum value a quality attribute may have. The value set in text box 526 is a threshold value for a quality attribute that will cause the quality attribute to be displayed as a Key Quality Attribute by the data analysis software platform. In FIG. 5, the threshold is set to a value of 6, so any quality attribute having a value of 6 or greater will be displayed by the data analysis software platform as a Key Quality Attribute. The Process Parameter PI Rank Settings apply to all quality attributes for manufacturing process 202. As shown in cause-and-effect matrix 402, the quality attributes Blend Uniformity, Stratified Tablet Content Uniformity and Impurity Profile each have a rank value of 7, which exceeds the threshold rank value of 6 and therefore would be determined by the data analysis software platform to be Key Quality Attributes.

Figure 6:
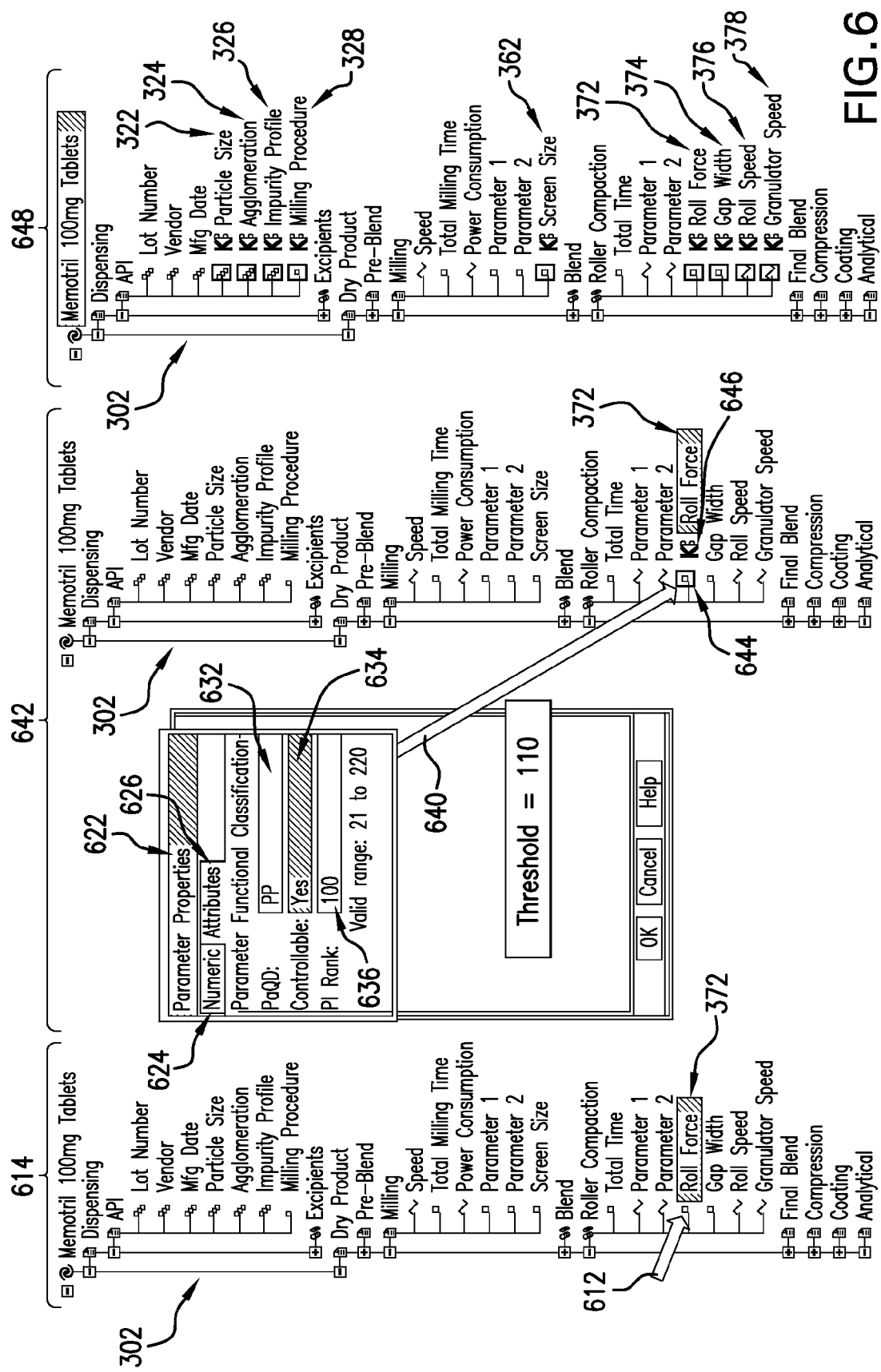
FIG. 6 is a screenshot of a Parameters Properties window of a process intelligence software platform used to analyze the manufacturing process of FIG. 2 according to one embodiment of the present invention.

Arrow 612 in column 614 of FIG. 6 shows data leaf 372 of hierarchical data structure 302 being selected for labeling by a user according to one embodiment of the present invention. Window 622, labeled "Parameter Properties" shows the process parameter properties of the process parameter "roll force" that would be displayed when a user selects data leaf 372 that contains data for the process parameter "roll force." Window 622 includes a tabbed window 624 labeled "numeric" that displays the numeric properties of the process parameter "roll force." The input entry boxes of tabbed window 624 are not shown in FIG. 6. Window 624 also includes an attributes tabbed window 626 that shows the function classifications for the process parameter "roll force." The function classifications of the process parameter "roll force" are shown in text boxes 632, 634 and 636. Text box 632 shows that the Parameter Quality Designation (PaQD) for the process parameter "roll force" has been selected as Process Parameter (abbreviated "PP"). Text box 634 shows whether the process parameter "roll force" is considered controllable by a person operating the process, or an automated control system associated with the process. The word "Yes" in this box indicates that the process parameter "roll force" is controllable. Text box 636 shows the total rank score for the process parameter "roll force." In FIG. 6, text box shows the total rank score of 100 for a process parameter that is being used as an arbitrary starting value to enable the parameter to be classified as a Key Process Parameter. Arrow 640 of column 642 of FIG. 6 points to visual indicators 644 and 646 of data leaf 372. Visual indicator 644 is a box and indicates that a user has selected the process parameter "roll force" to be displayed as a controllable parameter. Visual indicator 646 is a stylized KPP symbol indicating that the process parameter "roll force" is a Key Process Parameter but has not yet been determined as to whether or not it is a Critical Process Parameter. Column 648 of FIG. 6 shows the process parameters represented by data leaves 322, 324, 326, 328, 362, 372, 374, 376 and 378 being displayed. The process parameters represented by data leaves 322, 324, 326, 328, 362, 372, 374, 376 and 378 correspond to the process parameters of Focus Area #1 and Focus Area #5 of cause-and-effect matrix 402.

Figure 7:
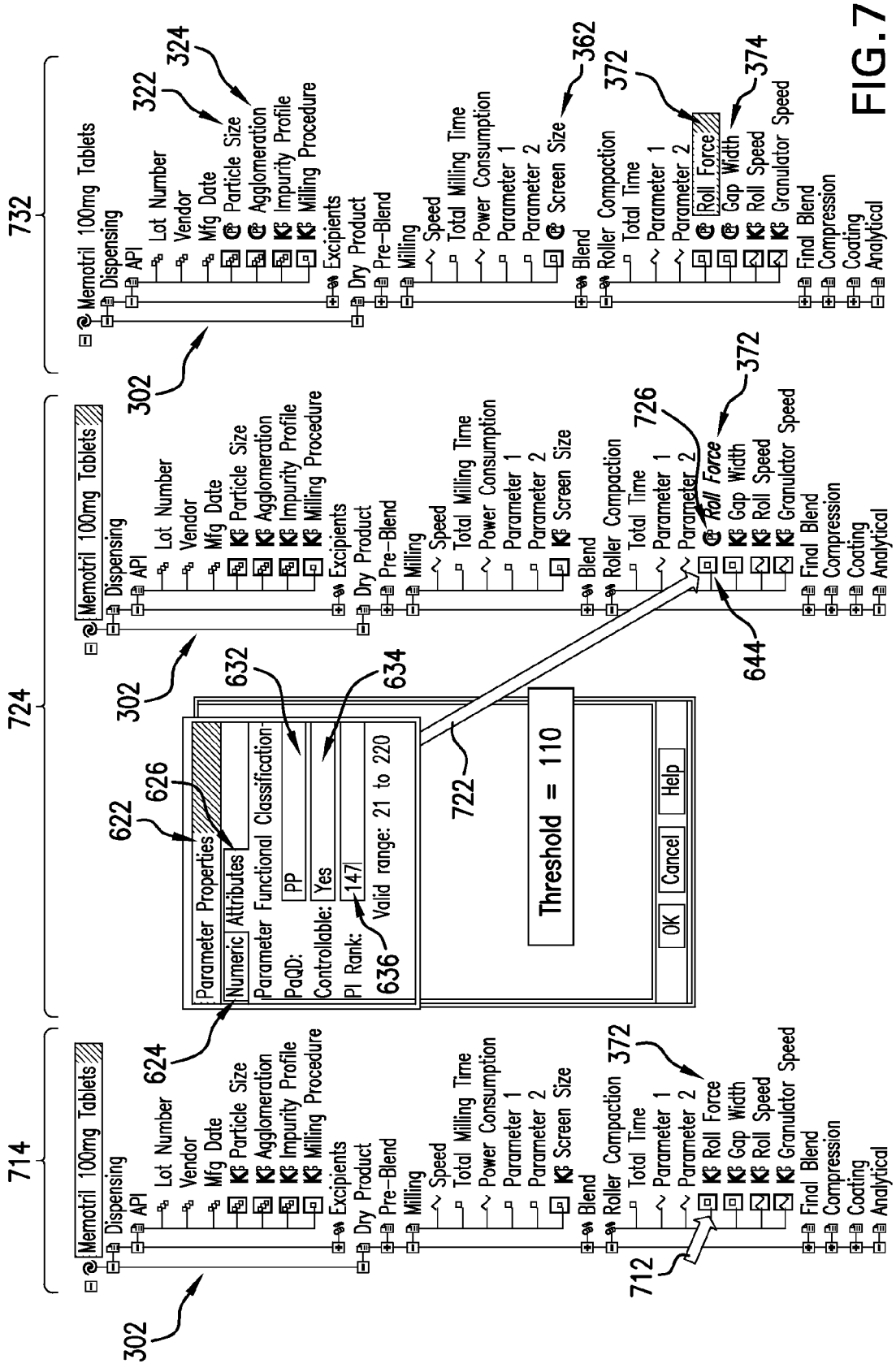
FIG. 7 is a screenshot of the Parameters Properties window of FIG. 6 showing the Process Impact (PI) Rank value for the roll force parameter of the roller compaction and milling step of the manufacturing process of FIG. 2 being updated.

Arrow 712 in column 714 of FIG. 7 shows data leaf 372 of hierarchical data structure 302 being selected for updating by a user using the data analysis software platform according to one embodiment of the present invention. In FIG. 7, the value in text box 636 has been updated with the total rank score of 147 for the process parameter "roll force" based on the results of risk analysis shown in cause-and-effect matrix 402. Because the total rank score of 147 for the process parameter "roll force" exceeds the threshold value of 110, the process parameter "roll force" is determined by the data analysis platform to be a Critical Process Parameter, and this results, as shown by arrow 722 of column 724 of FIG. 7 in the data analysis software platform replacing visual indicator 646 with visual indicator 726 for data leaf 372. Visual indicator 726, which is a stylized CPP, indicates that "roll force" is a Critical Process Parameter. The word "Roll Force" in data leaf 372 has also, at least temporarily, changed color and become italicized, which indicates that it has not yet been verified whether or not the total rank score was input correctly. Column 732 of FIG. 7 shows the data analysis software platform having replaced the visual indicator 646 with the visual indicator 726 for data leaves 322, 324, 362, 372 and 374 that represent Critical Process Parameters for manufacturing process 202 because each of these Critical Process Parameters has a total rank score that exceeds the threshold of 110.

Figure 8:
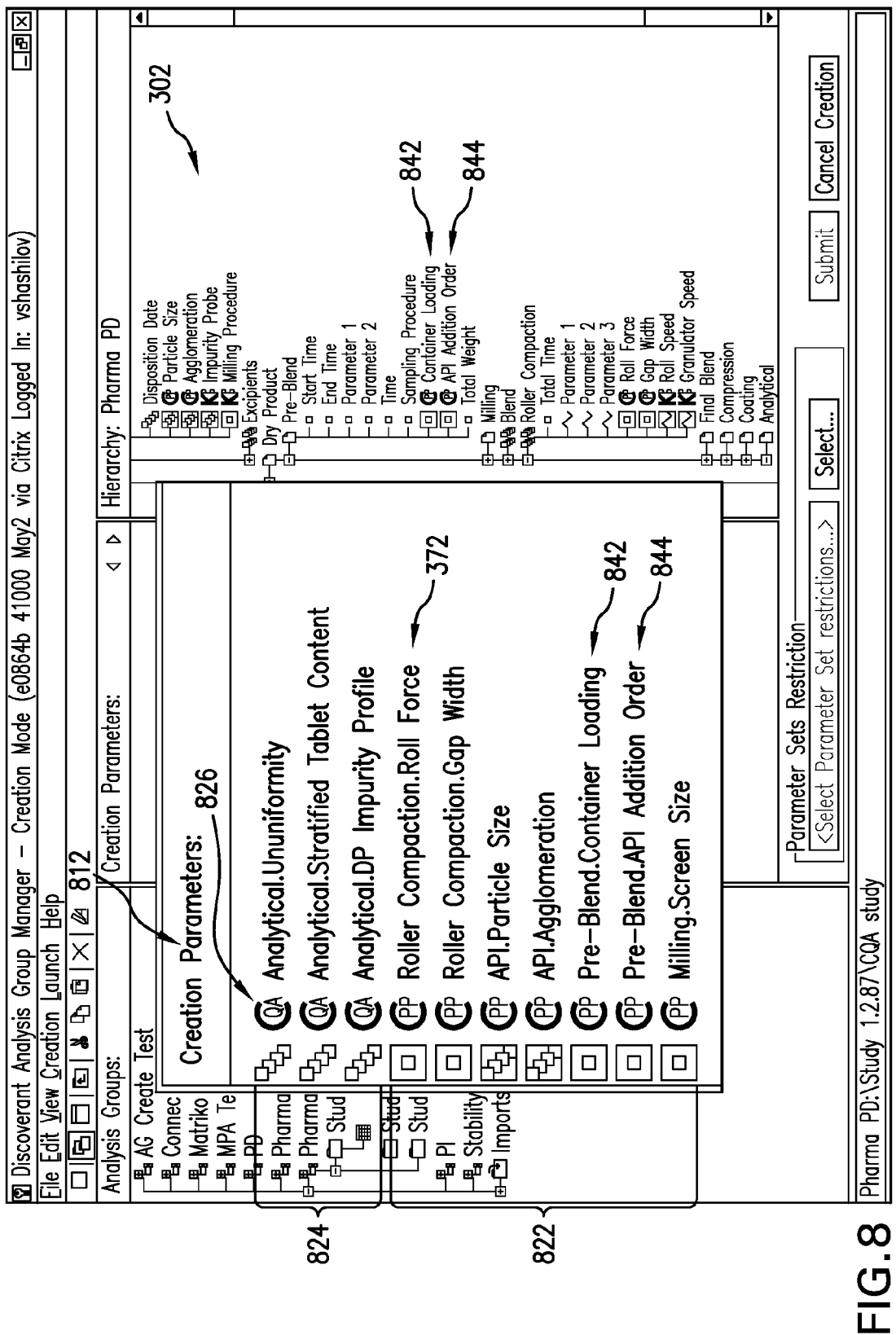
FIG. 8 is a screenshot of a user accessing designated parameters of the manufacturing process of FIG. 2 using a process intelligence software platform according to one embodiment of the present invention.

FIG. 8 shows a data analysis software platform displaying in a window 812, labeled "Creation Parameters", the names of selected process parameters that have been displayed by a data analysis software platform as being Critical Process Parameters, indicated by a bracket 822, and the names of quality attributes that have been displayed as Critical Quality Attributes, as indicated by a bracket 824 that each has a stylized "CPP" or "CQA" visual indicator 826. The names for the parameters in window 812 include the name of the data node that the data leaf is under. So the parameter represented by data leaf 372 is named "Roller Compaction.Roll Force" because the parameter represented by data leaf 372 is under data node 342 named "Roller Compaction" in hierarchical data structure 302. Parameter 842 for container loading for pre-blending step 212 and data leaf 844 for API addition order for pre-blending step 214 have been determined to be Critical Process Parameters during a previous risk assessment of manufacturing process 202 and are therefore displayed with the corresponding symbols. These parameters are now easily available to be worked with in any meaningful way, such as for example performing data analysis to determine if there are interactions between them.

Figure 9:
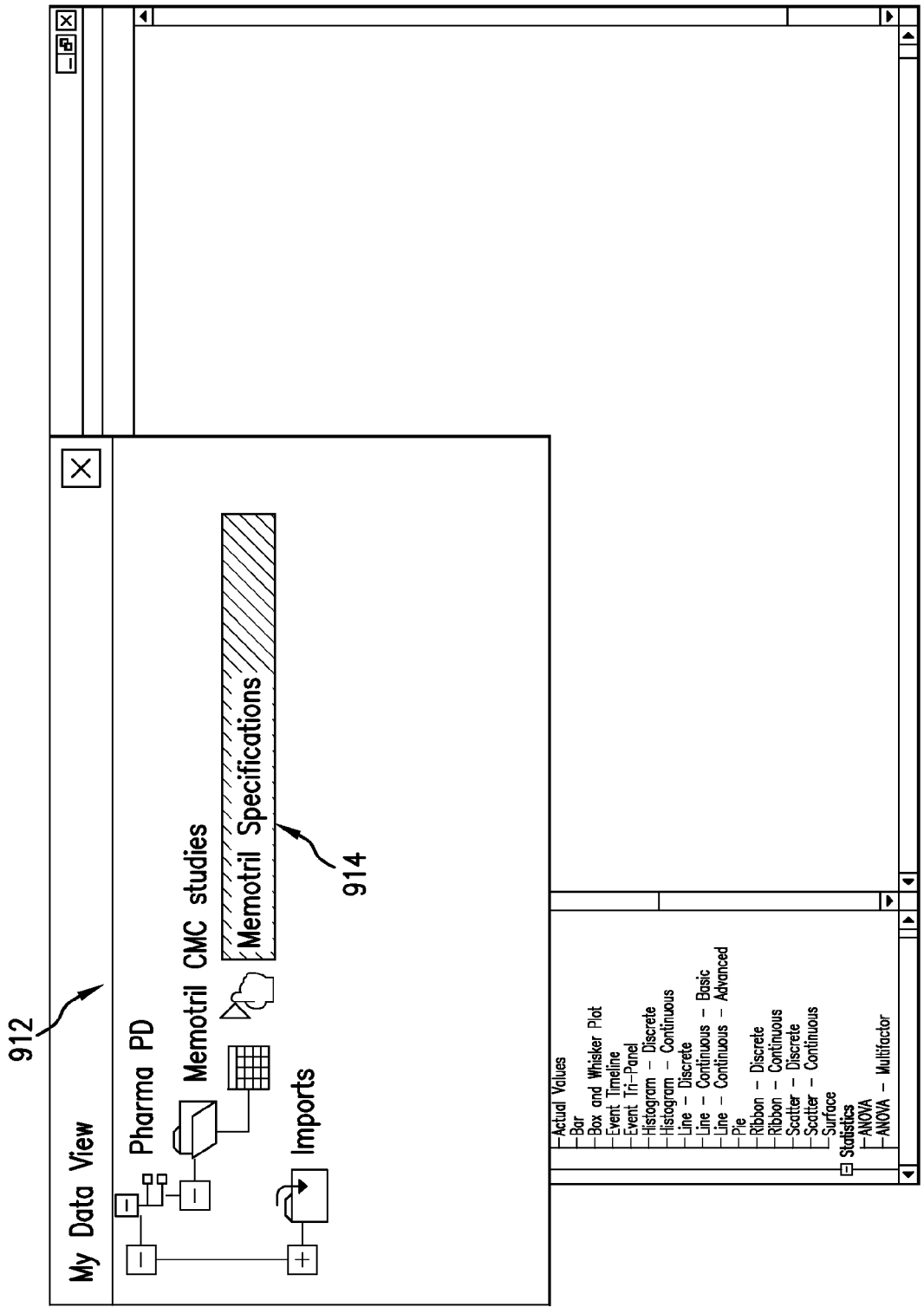
FIG. 9 is a screenshot of a user storing study results related to specifications for a pharmaceutical product for the Chemistry, Manufacturing and Control (CMC) studies for the pharmaceutical product of the manufacturing process of FIG. 2 in a window of a process intelligence software platform according to one embodiment of the present invention.

FIG. 9 shows a user opening a window 912 of a data analysis software platform according to one embodiment of the present invention to access specifications 914 for a drug product from Chemistry, Manufacturing and Control (CMC) studies for the drug product Memotril of manufacturing process 202.

Figure 10:
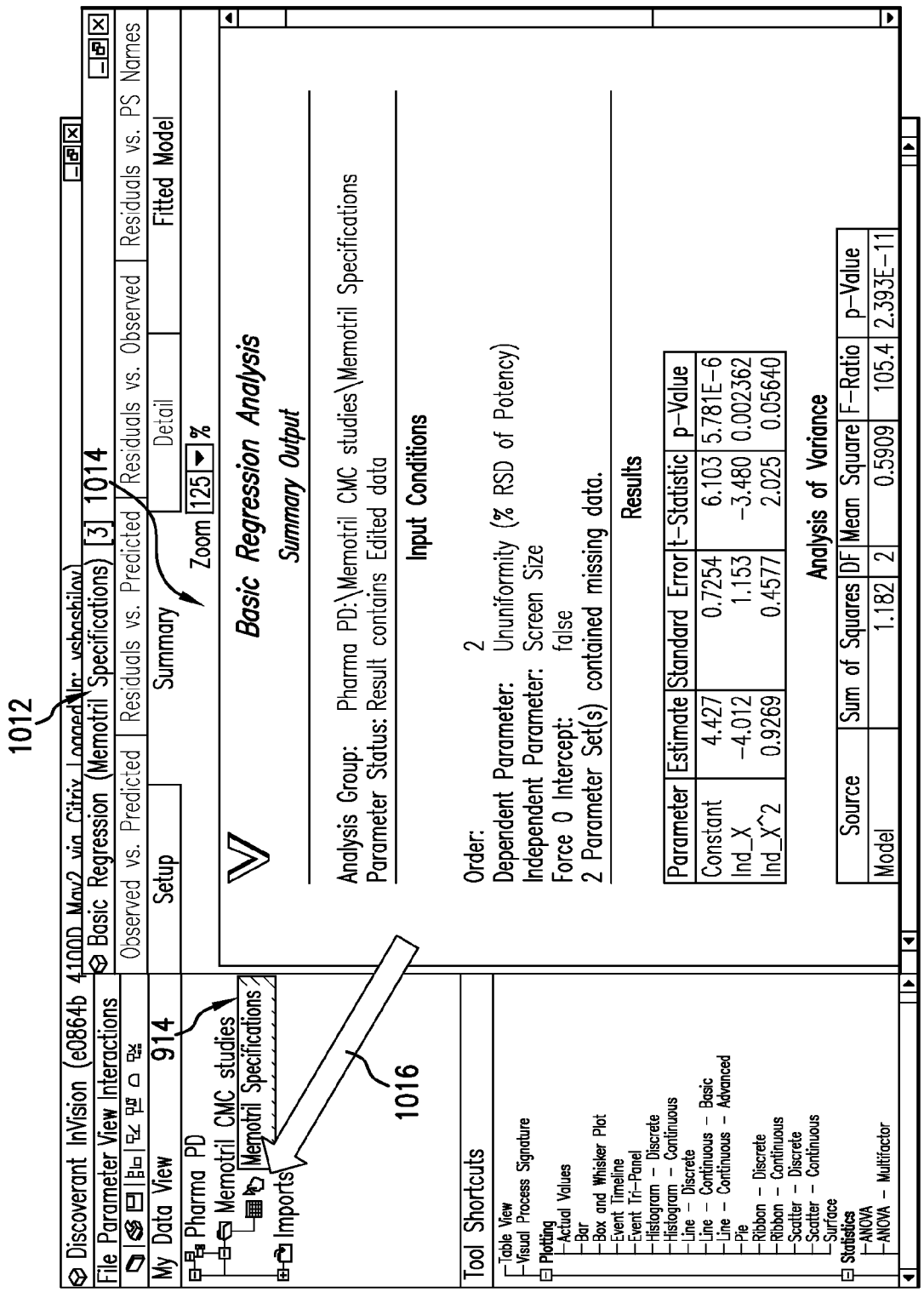
FIG. 10 is a screenshot of a tabbed window summary of the basic regression analysis that is part of the specifications for the pharmaceutical product accessed in FIG. 9.
Figure 11:
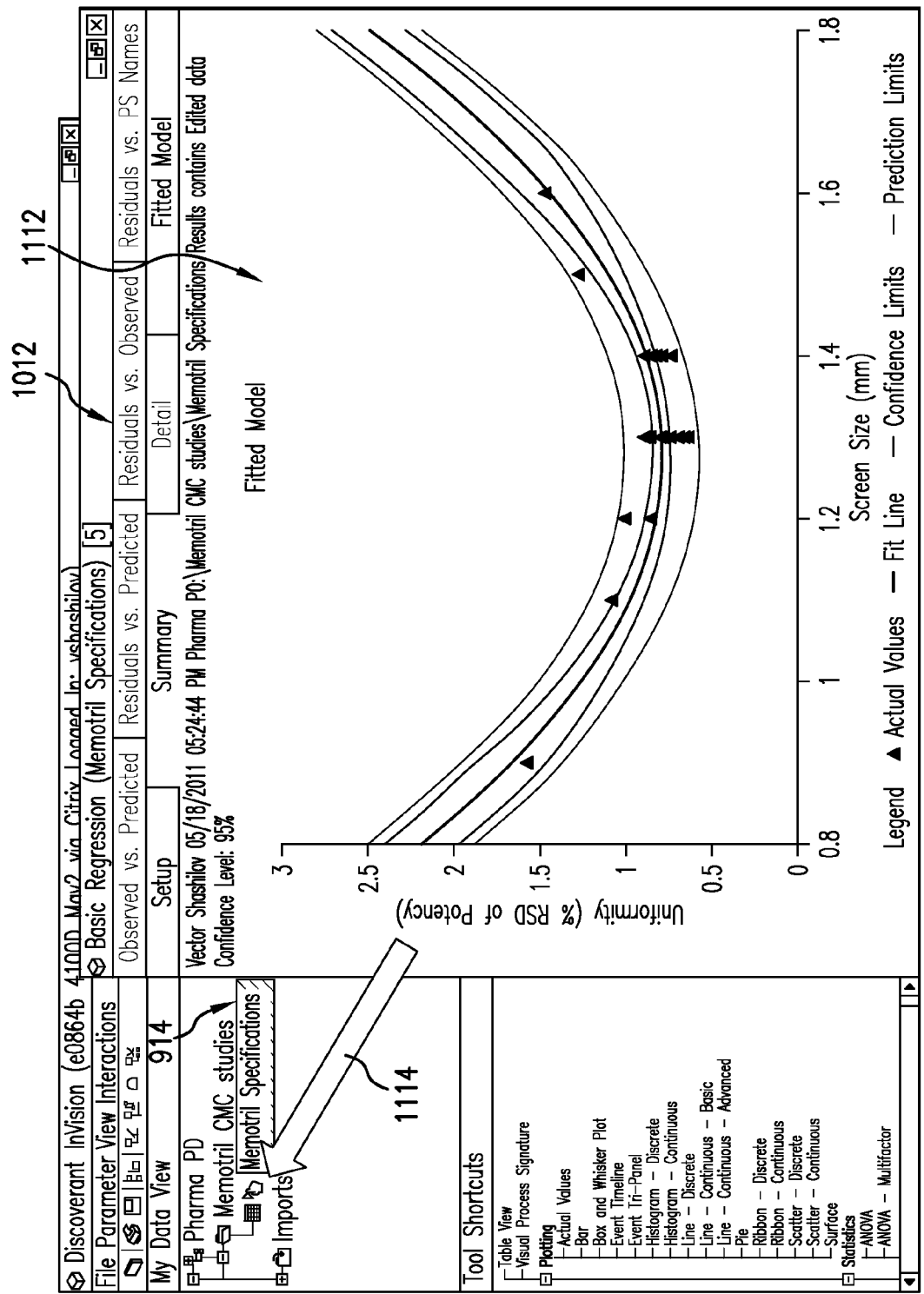
FIG. 11 is a screenshot of a tabbed window showing a graph of uniformity vs. screen size for a fitted model for the pharmaceutical product that is part of the specifications for the pharmaceutical product accessed in FIG. 9.
Figure 12:
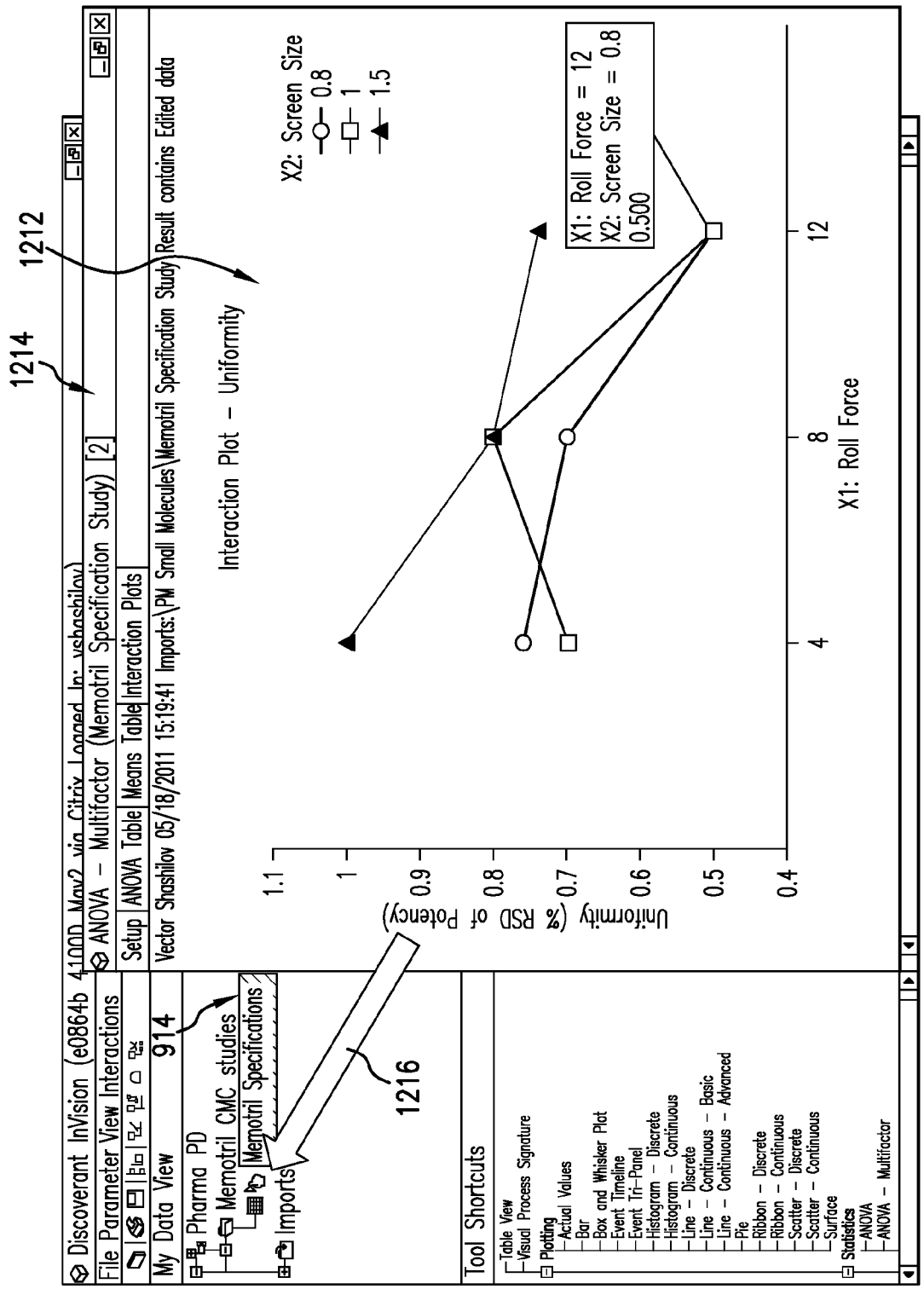
FIG. 12 is a screenshot of a tabbed window showing interaction plots of uniformity vs. roll force and screen size for the pharmaceutical product that is part of the specifications for the pharmaceutical product accessed in FIG. 9.
Figure 13:
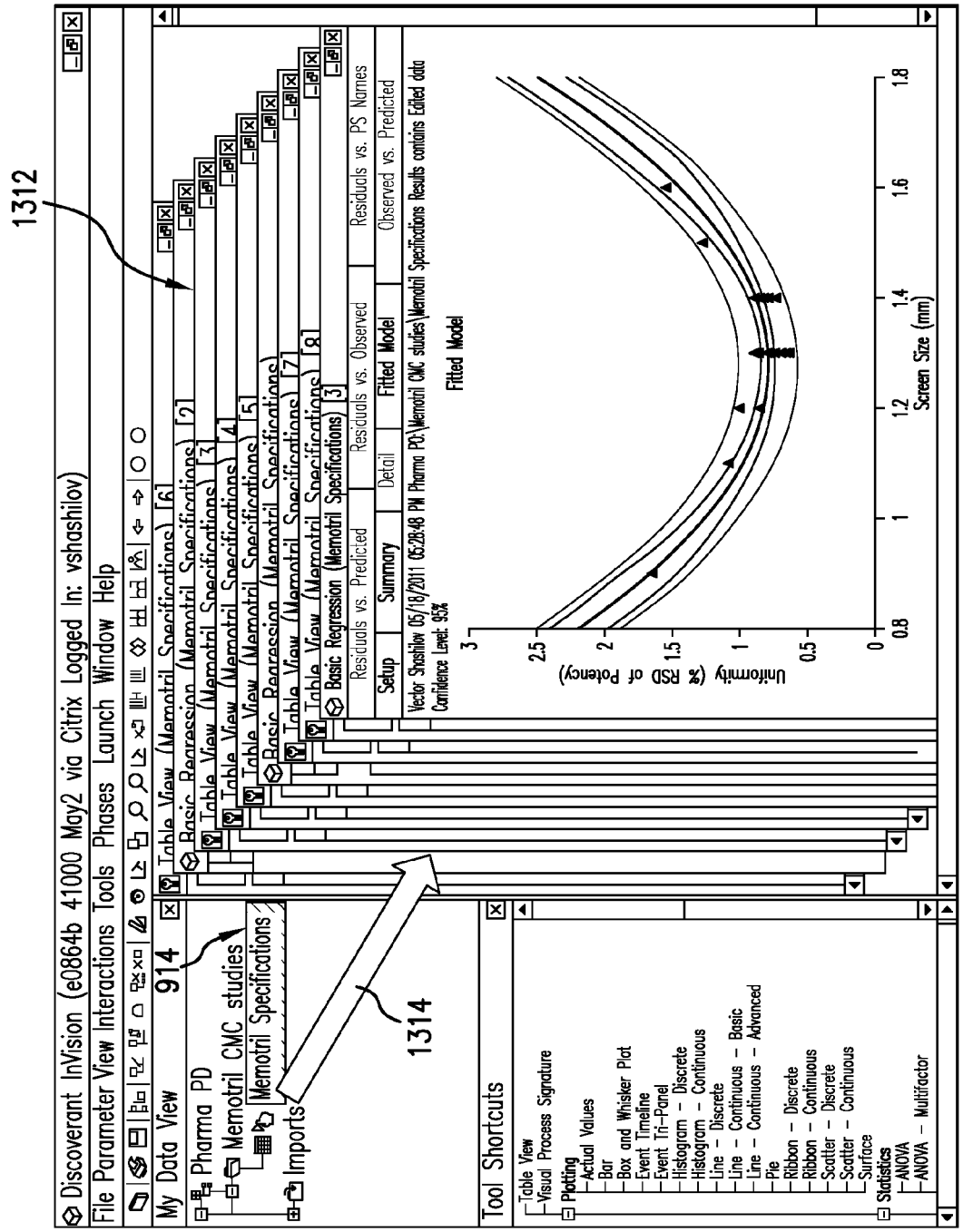
FIG. 13 is a screenshot of a series of windows including the results of several studies for specifications for the pharmaceutical product accessed in FIG. 9.

FIG. 10 shows a window 1012 that includes a summary tabbed window 1014 of a basic regression analysis that is one of specifications 914 for the drug product as indicated by arrow 1016. FIG. 11 shows a fitted model tabbed window 1112 of window 1012 that displays a fitted model of uniformity vs. screen size that is one of specifications 914 for the drug product as indicated by arrow 1114. FIG. 12 shows an interaction plots tabbed window 1212 of a window 1214 that displays interaction plot of uniformity vs. roll force that is one of specifications 914 for the drug product as indicated by arrow 1216. FIG. 13 shows a series of windows 1312 including specifications 914 of the drug product as indicated by arrow 1314. FIG. 14 shows a CMC submission 1412 for the drug product manufactured by manufacturing process 202 that may be generated using a data analysis software platform according to one embodiment of the present invention.

Figure 15:
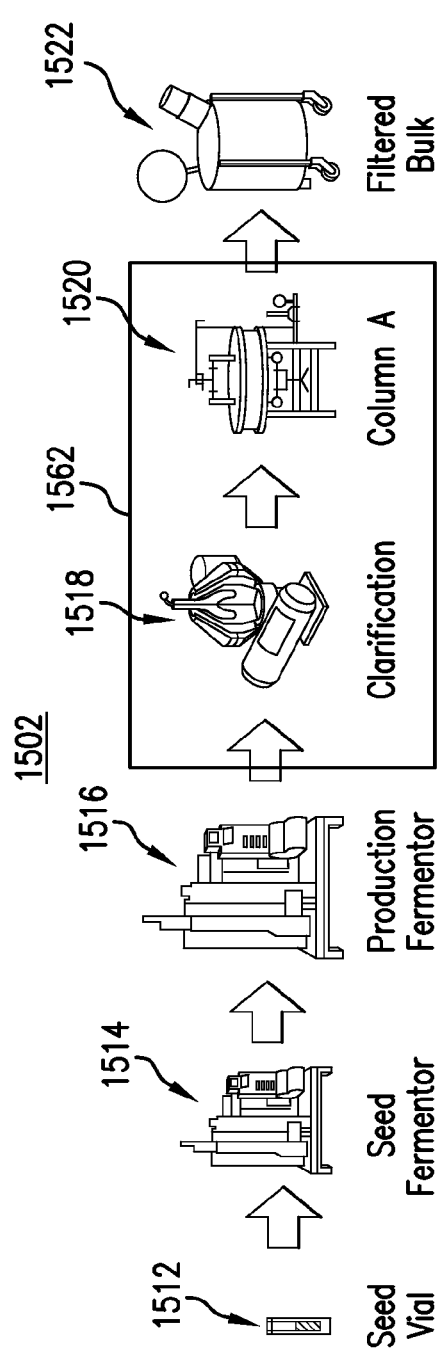
FIG. 15 is a schematic diagram showing a manufacturing process for a pharmaceutical product and the identification of Key Process Parameters and Key Quality Attributes according to one embodiment of the present invention.

FIG. 15 shows a manufacturing process 1502 for an exemplary (and fictitious) pharmaceutical product (Lazarin). Manufacturing process 1502 includes in order: a seed flask step 1512, a seed fermentation step 1514, a production fermentation step 1516, a clarification step 1518, a column filtration step 1520 (conducted in Column A), and a bulk filtration step 1522. An analyzed portion 1562 of manufacturing process 1502 comprises clarification step 1518 and column filtration step 1520.

The following process parameters for manufacturing process 1502 are identified as key process parameters: hold time, feed flow rate, pump speed, initial PH concentrate flow rate, concentrate OD, adjusted pH, amount of base added, concentrate BP, load conductivity, step yield, repack date, load volume and load temperatures. The following quality attributes for manufacturing process 1502 are identified as key quality attributes: endotoxin, potency and Contaminant A.

Figure 16:
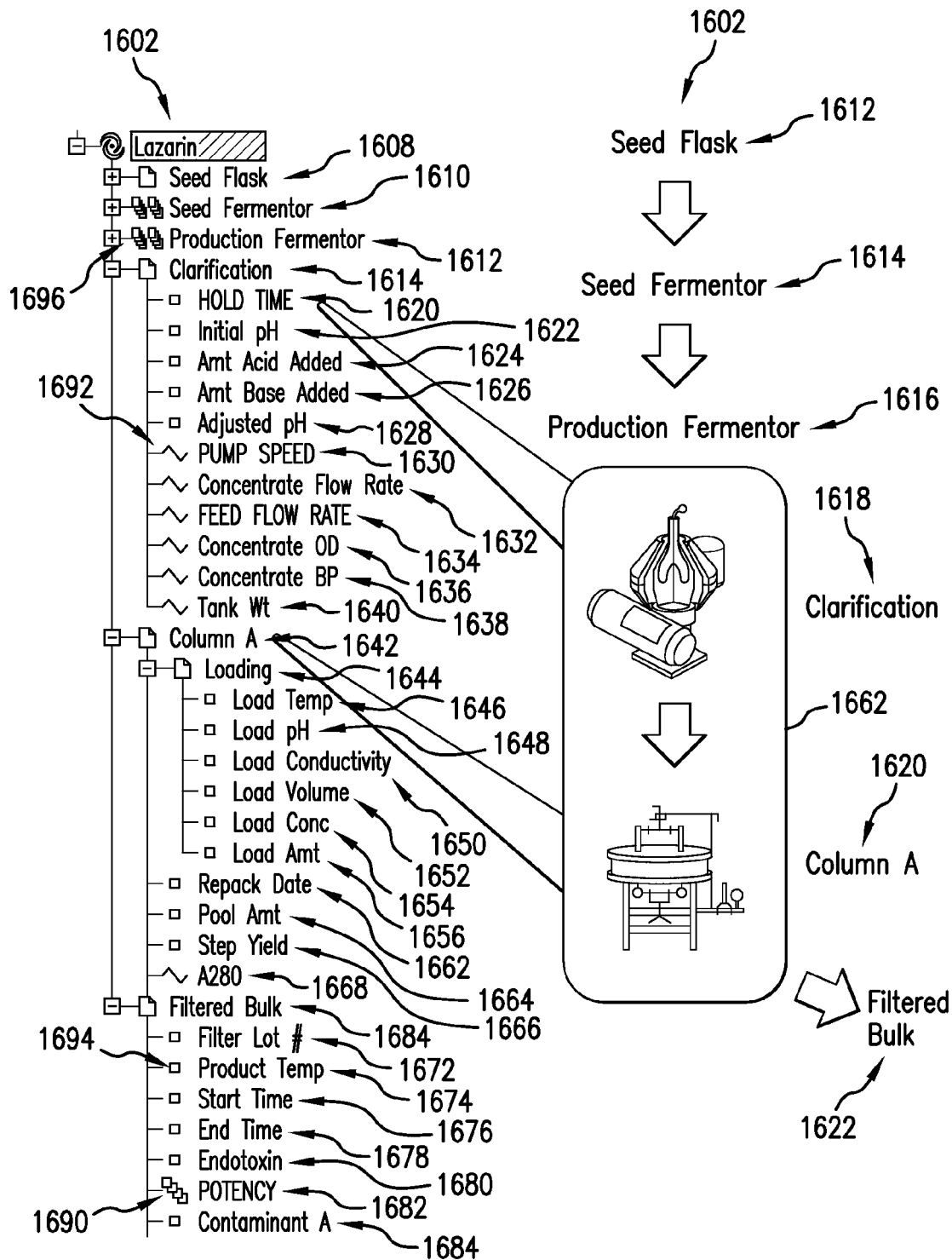
FIG. 16 shows a hierarchical data structure for the manufacturing process of FIG. 15 as depicted in a data analysis program according to one embodiment of the present invention.

FIG. 16 shows the data for manufacturing process 1502 organized in a hierarchical data structure 1602 by a process intelligence software platform such as Discoverant®. The data for seed flask step 1512 are organized under a data node 1608 labeled "Seed Flask." The data for seed fermentation step 1514 are organized under a data node 1610 labeled "Seed Fermentor." The data for production fermentation step 1516 are organized under a data node 1612 labeled "Production Fermentor." The data for clarification step 1518 are organized under a data node 1614 labeled "Clarification." Under data node 1614 are data leaf 1620 providing access to data for the hold time during clarification step 1518, data leaf 1622 providing access to data for the initial pH for clarification step 1518, data leaf 1624 providing access to data for the amount of acid added in clarification step 1518, data leaf 1626 providing access to data for the amount of base added in clarification step 1518, data leaf 1628 for the adjusted pH in clarification step 1518, data leaf 1630 providing access to data for pump speed in clarification step 1518, data leaf 1632 providing access to data for the concentrate flow rate in clarification step 1518, data leaf 1634 providing access to data for the feed flow rate in clarification step 1518, data leaf 1636 providing access to data for the concentrate OD in clarification step 1518, data leaf 1638 providing access to data for the concentrate BP in clarification step 1518 and data leaf 1640 providing access to data for the tank weight in clarification step 1518.

The data for column filtration step 1520 are organized as data leaves under a data node 1642 labeled "Column A." Under data node 1642 are a data node 1644 labeled "Loading" under which are data leaves 1646, 1648, 1650, 1652, 1654 and 1656 that are providing access to data related to the loading of Column A during column filtration step 1520. Data leaf 1646 provides access to data for the load temperature, data leaf 1648 provides access to data for the load pH, data leaf 1650 provides access to data for the load conductivity, data leaf 1652 provides access to data for the load volume, data leaf 1654 provides access to data for the load concentration, and data leaf 1656 provides access to data for the load amount. Also under data node 1642 are data leaf 1662 providing access to data for the repack date for Column A, data leaf 1664 providing access to data for the pool amount for Column A, data leaf 1666 providing access to data for the step yield for column filtration step 1520 and data leaf 1668 providing access to data for the A280 for column filtration step 1520.

The data for bulk filtration step 1522 are organized in data leaves 1672, 1674, 1676, 1678, 1680, 1682 and 1684 under a data node 1684 labeled "Filtered Bulk." Data leaf 1672 provides access to data for filter lot number for bulk filtration step 1522, data leaf 1674 provides access to data for product temperature for bulk filtration step 1522, data leaf 1676 provides access to data for start time for bulk filtration step 1522, data leaf 1678 provides access to data for end time for bulk filtration step 1522, data leaf 1680 provides access to data for endotoxin for bulk filtration step 1522, data leaf 1682 provides access to data for the potency of the product after bulk filtration step 1522 and data leaf 1684 provides access to data for the amount of Contaminant A present in the product after bulk filtration step 1522.

In FIG. 16, data leaf 1682 provides access to replicate data as indicated by multiple square symbol 1690 for this data leaf Data leaves 1630, 1632, 1634, 1636, 1638, 1640 and 1668 provides access to continuous data, as indicated by the wave-like symbol 1692 for these data leaves. Data leaves 1620, 1622, 1624, 1626, 1628, 1646, 1648, 1650, 1652, 1654, 1656, 1658, 1660, 1662, 1664, 1666, 1672, 1674, 1676, 1678, 1680 and 1684 provides access to discrete data, as indicated by the square symbol 1694 for these data leaves. Data nodes and 1610 and 1612 include double symbol 1696 indicating these data nodes are associated with meta-data that is used by the query engine to construct the queries that retrieve the data.

In one embodiment of the present invention, quality attributes for manufacturing process 1502 are assigned numerical ranks 10, 7, 5 and 1. The criteria for assigning the numerical ranks are provided below:

10—known or expected direct impact on safety and/or efficacy of product;

7—unsure or expected impact on product safety or efficacy, or on process efficiency;

5—unlikely impact on product quality or process efficiency; and

1—no impact on product quality or process efficiency.

Rankings 10, 7, 5 and 1 are based on the results of manufacturing previous products using manufacturing process 1502.

In one embodiment of the present invention, process parameters for manufacturing process 1502 are assigned numerical ranks 10, 7, 5 and 1. The criteria for assigning the numerical ranks are provided below:

10—known or expected strong impact based on data in hand or experience;

7—unsure but expect a strong relationship;

5—medium relationship or not sure; and

1—known there is not a relationship.

Rankings 10, 7, 5 and 1 are based on the results of manufacturing previous products using manufacturing process 1502.

FIG. 17 shows an example of a cause-and-effect matrix 1702 for an analysis of parameters for manufacturing process 1502. Cause-and-effect matrix 1702 has two areas of focus for the following three quality attributes: Endotoxin, Potency and Contaminant A, each of which is assigned a rank of 7. Focus Area #1 relates to clarification step 1518 and includes an analysis of the following causes for manufacturing process 1502: hold time, feed flow rate, pump speed, initial pH, concentrate flow rate, concentrate OD, adjusted pH, amount of base added and concentrate back pressure. The process parameters for Focus Area #1 are a mix of process step parameters and input material attributes. Focus Area #5 relates to column filtration step 1520 and includes an analysis of the following process parameters for manufacturing process 1502: load conductivity, step yield, repack date, load volume and load temperature. The process parameters for Focus Area #5 are a mix of process step parameters and input material attributes.

In cause-and-effect matrix 1702, the ranking value for each quality attribute is multiplied by the ranking value for each process parameter to yield a cause-and-effect quality score for each process parameter for each quality attribute. Adding the cause-and-effect quality score for each quality attribute value yields a score. For example, for the process parameter initial pH which has a process parameter rank of 7, the cause-and-effect quality score for the quality attribute Endotoxin is 7×10=70, the cause-and-effect quality score for the quality attribute Potency is 7×5=35, and the cause-and-effect quality score for the quality attribute Contaminant A is 7×1=7. Therefore, the total rank score for the process parameter initial pH is 70+35+7=112.

Figure 18:
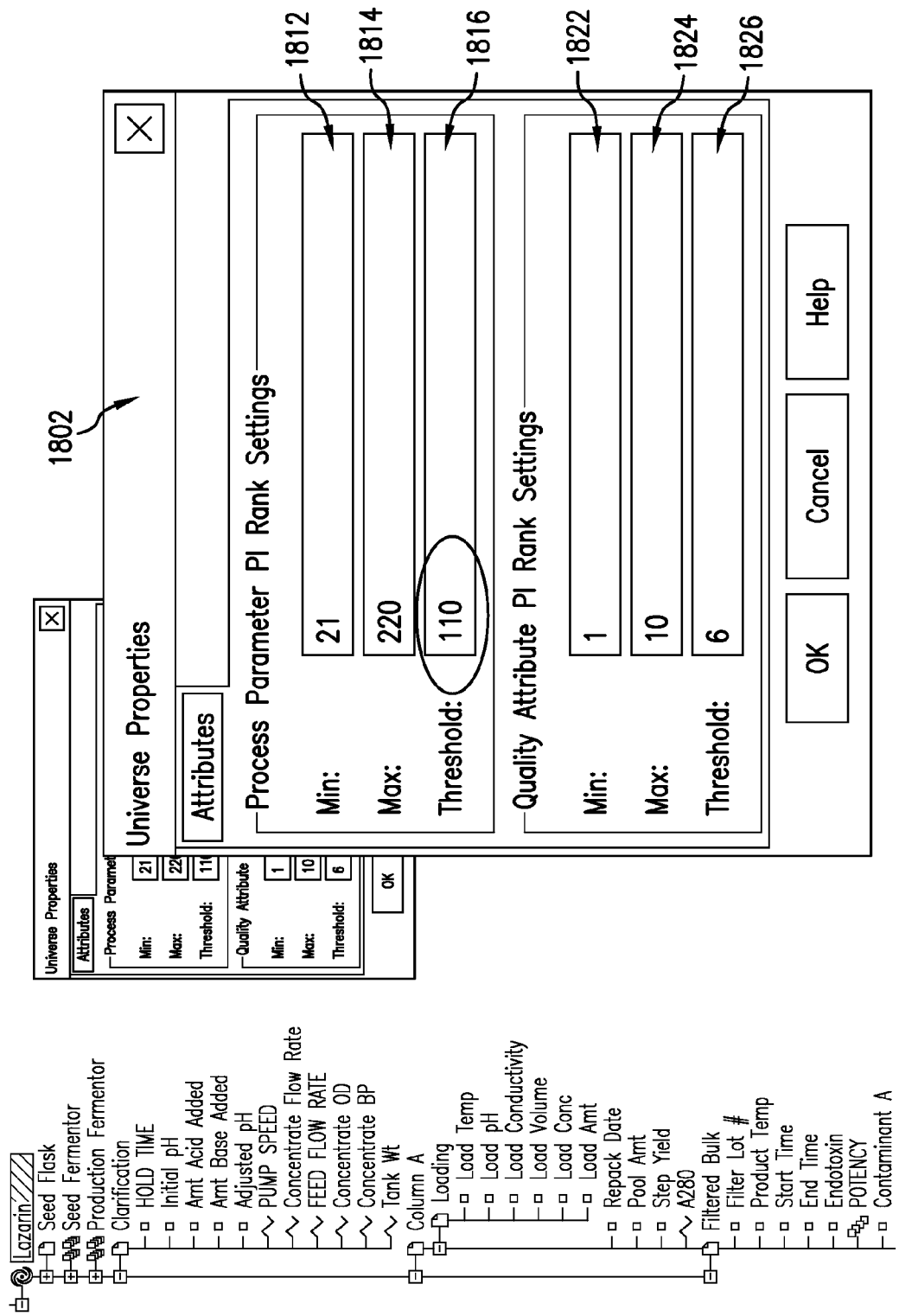
FIG. 18 is a screenshot of a Universe Properties window of a process intelligence software platform used to analyze the manufacturing process of FIG. 2 according to one embodiment of the present invention.

FIG. 18 shows a universe properties window 1802 of a process intelligence software platform such as Discoverant® that is part of a method for allowing the software platform to display the outcomes of a risk assessment method according to one embodiment of the present invention. Universe properties window 1802 includes text boxes 1812, 1814 and 1816 for Process Parameter Process Impact (PI) Rank Settings. The Process Parameter PI Rank Settings in the Universe Properties window 1802 apply to all process parameters for manufacturing process 1502. The value set in text box 1812 is the minimum total rank score a process parameter may have. The value set in text box 1814 is the minimum total rank score a process parameter may have. The value set in text box 1816 is a threshold total rank score for a process parameter that if exceeded will cause the process parameter to be displayed as a Critical Process Parameter by the process intelligence software platform. In FIG. 18, the threshold is set to a total rank score of 110, so any process parameter having a total rank score of 110 or greater will be displayed by the data analysis platform as a Critical Process Parameter. The Process Parameter PI Rank Settings apply to all process parameters for manufacturing process 1502 that are to be analyzed. As shown in cause-and-effect matrix 1702, for manufacturing process 1502, the process parameters hold time, fee flow rate, pump speed, initial pH, load conductivity, step yield and repack date all have scores that exceed this threshold and therefore all three process parameters would be determined by the process intelligence software platform to be Critical Process Parameters.

Universe properties window 1802 also includes text boxes 1822, 1824 and 1826 for Quality Attribute PI Rank Settings. The value set in text box 1822 is the minimum value a quality attribute may have. The value set in text box 1824 is the maximum value a quality attribute may have. The value set in text box 1826 is a threshold value for a quality attribute that will cause the quality attribute to be displayed as a Key Quality Attribute by the process intelligence software platform. In FIG. 18, the threshold is set to a value of 6, so any quality attribute having a value of 6 or greater will be displayed by the process intelligence software platform to be a Key Quality Attribute. The Process Parameter PI Rank Settings apply to all quality attributes for manufacturing process 1502. As shown in cause-and-effect matrix 1702, the quality attributes Endotoxin, Potency and Contaminant A each have a rank value of 7 which exceeds the threshold rank value of 6 and therefore would be determined by the process intelligence software platform to be key quality parameters.

Figure 19:
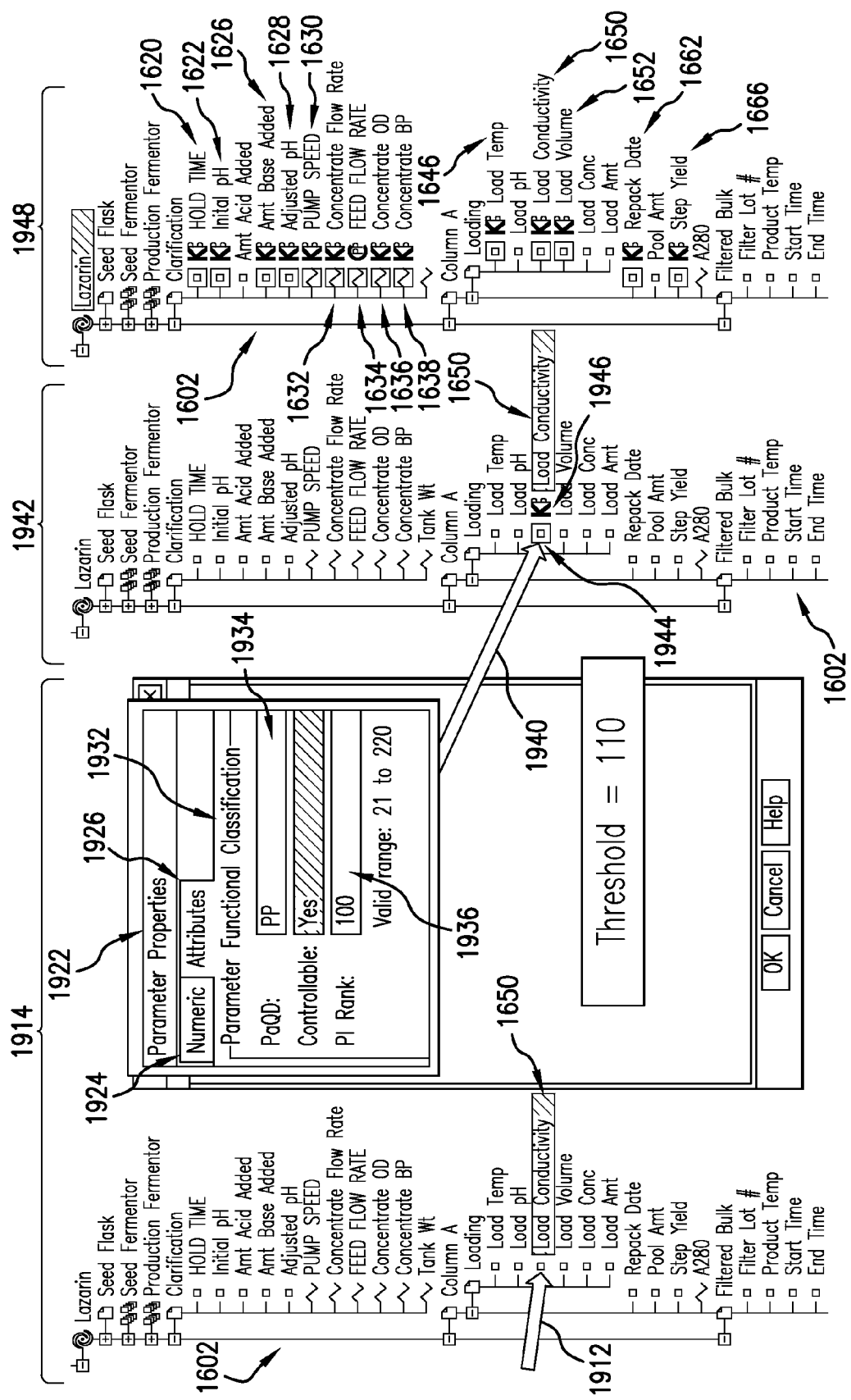
FIG. 19 is a screenshot of a Parameters Properties window of a process intelligence software platform used to analyze the manufacturing process of FIG. 15 according to one embodiment of the present invention.

Arrow 1912 in column 1914 of FIG. 19 shows data leaf 1650 of hierarchical data structure 1602 being selected for labeling by a user according to one embodiment of the present invention. Window 1922, labeled "Parameter Properties," shows the process parameter properties of the process parameter "load conductivity" that would be displayed when a user selects data leaf 1650 that provides access to data for the process parameter "load conductivity." Window 1922 includes a tabbed window 1924 labeled "numeric" that displays the numeric properties of the process parameter "roll force." The input entry boxes of tabbed window 1924 are not shown in FIG. 19. Window 1924 also includes an attributes tabbed window 1926 that shows the function classifications for the process parameter "load conductivity." The function classifications of the process parameter "load conductivity" are shown text boxes 1932, 1934 and 1936. Text box 1932 shows that the Parameter Quality Designation (PaQD) for the process parameter "load conductivity" has been selected as Process Parameter (abbreviated "PP"). Text box 1934 shows whether the process parameter "load conductivity" is considered controllable by a person operating the process, or an automated control system associated with the process. The word "Yes" in this box indicates that the process parameter "load conductivity" is controllable. Text box 1936 shows the total rank score for the process parameter "load conductivity." In FIG. 19, text box shows the total rank score of 100 for a process parameter that is being used as an arbitrary starting value to enable the parameter to be classified as a Key Process Parameter. Arrow 1940 of column 1942 of FIG. 19 points to visual indicators 1944 and 1946 of data leaf 1972. Visual indicator 1944 is a box and indicates that a user has selected the process parameter "load conductivity" to be displayed as a controllable parameter. Visual indicator 1946 is a stylized KPP symbol indicating that the process parameter "load conductivity" is a Key Process Parameter but has not yet been determined as to whether or not it is a Critical Process Parameter. Column 1948 of FIG. 19 shows the process parameters represented by data leaves 1620, 1622, 1624, 1628, 1630, 1632, 1634, 1636, 1638, 1646, 1650, 1652, 1662 and 1666 being displayed. The process parameters represented by data leaves 1620, 1622, 1624, 1628, 1630, 1632, 1634, 1636, 1638, 1646, 1650, 1652, 1662 and 1666 correspond to the process parameters of Focus Area #1 and Focus Area #5 of cause-and-effect matrix 1702.

Figure 20:
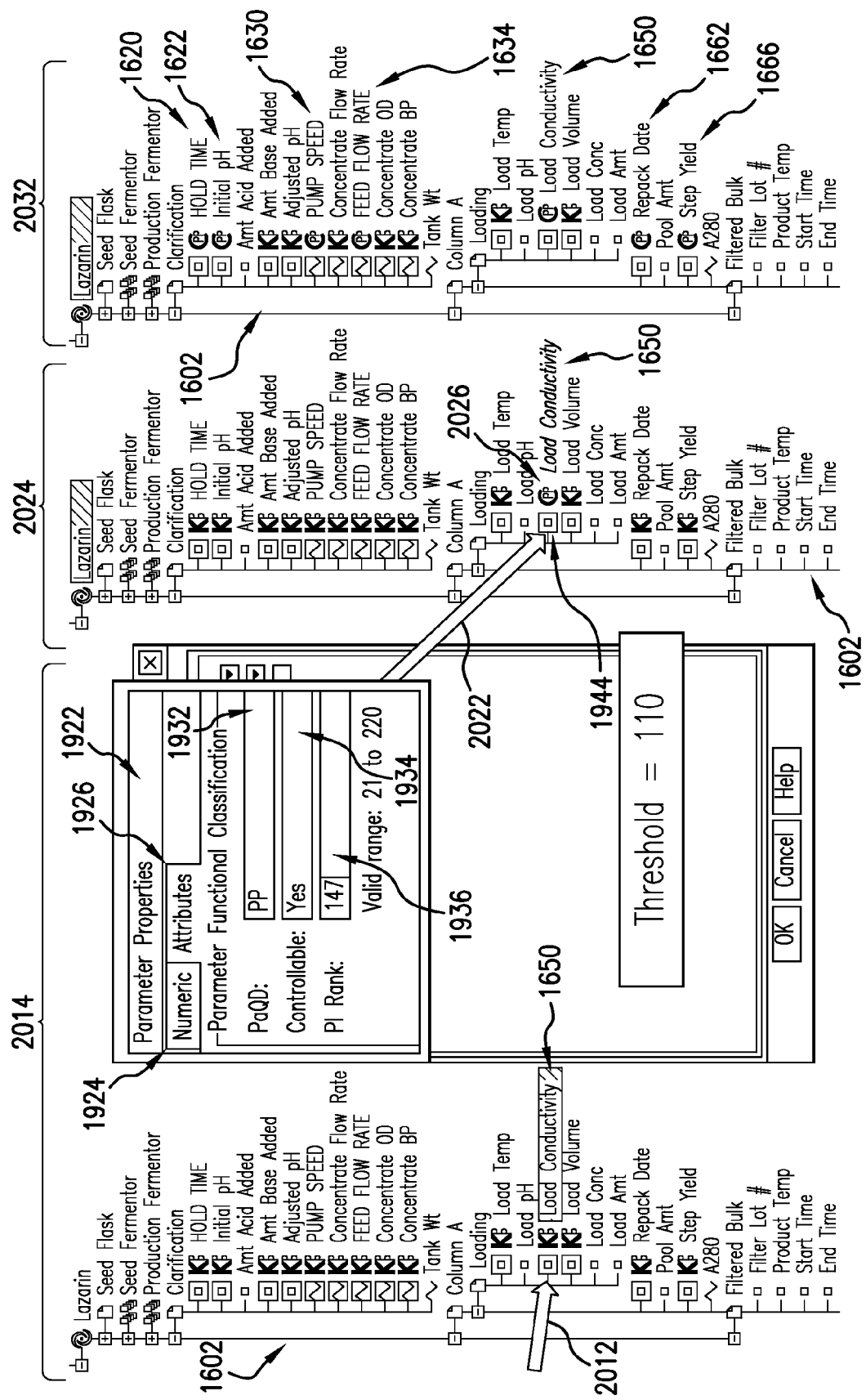
FIG. 20 is a screenshot of the Parameters Properties window of FIG. 19 showing the Process Impact (PI) Rank value for the roll force parameter of the roller compaction and milling step of the manufacturing process of FIG. 15 being updated.

Arrow 2012 in column 2014 of FIG. 20 shows data leaf 1650 of hierarchical data structure 1602 being selected for updating by a user using the process intelligence software platform according to one embodiment of the present invention. In FIG. 20, the value in text box 1936 has been updated with the total rank score of 147 for the process parameter "load conductivity" based on the results of the risk analysis shown in cause-and-effect matrix 1702. Because the total rank score of 147 for the process parameter "load conductivity" exceeds the threshold value of 110, the process parameter "load conductivity" is determined by the data analysis platform to be a Critical Process Parameter, and this results, as shown in by arrow 2022 of column 2024 of FIG. 20 in the process intelligence software platform replacing visual indicator 1946 with visual indicator 2026 for data leaf 1650. Visual indicator 2026, which is a stylized CPP, indicates that "load conductivity" is a Critical Process Parameter. The word "Load Conductivity" in data leaf 1650 has also, at least temporarily, changed color and become italicized, which indicates that it has not yet been verified whether or not the total rank score was input correctly. Column 2032 of FIG. 20 shows the process intelligence software platform having replaced the visual indicator 1946 with the visual indicator 2026 for data leaves 1620, 1622, 1630, 1634, 1650, 1662 and 1666 that represent Critical Process Parameters for manufacturing process 1502 because each of these Critical Process Parameters has a total rank score that exceeds the threshold of 110.

Figure 21:
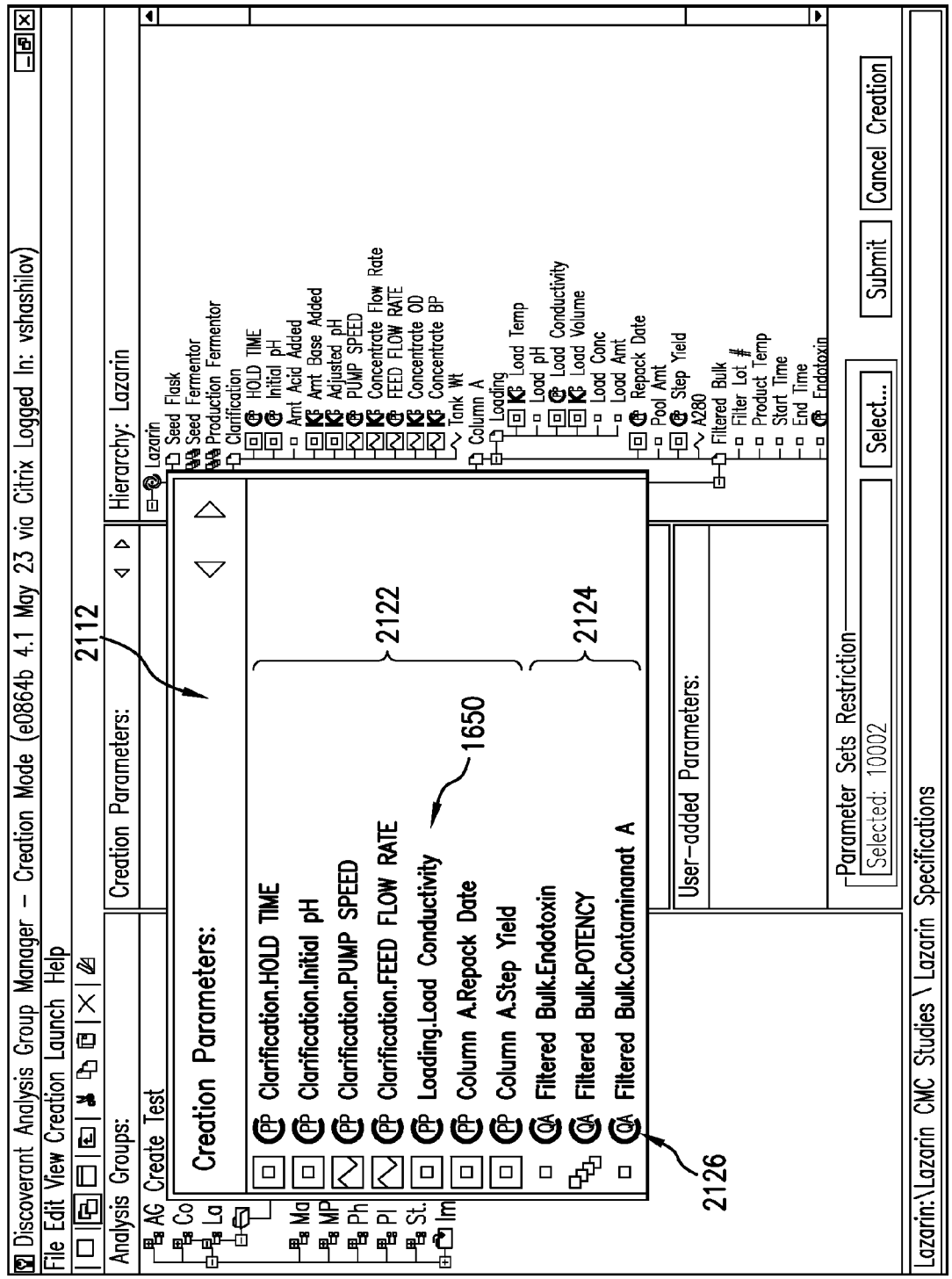
FIG. 21 is a screenshot of a user accessing designated parameters of the manufacturing process of FIG. 15 using a process intelligence software platform according to one embodiment of the present invention.

FIG. 21 shows a data analysis software platform displaying in a window 2112, labeled "Creation Parameters", the names of selected process parameters that have been displayed by a data analysis software platform as being Critical Process Parameters, indicated by a bracket 2122, and the names of quality attributes that have been displayed as Critical Quality Attributes, as indicated by a bracket 2124 that each has a stylized "CPP" or "CQA" visual indicator 2126. The names for the parameters in window 2112 include the name of the data node that the data leaf is under. So the parameter represented by data leaf 1650 is named "Loading.Load Conductivity" because the parameter represented by data leaf 1650 is under data node 1644 named "Loading" in hierarchical data structure 1602. These parameters are now easily available to be worked with in any meaningful way, such as for example performing data analysis to determine if there are interactions between them.

Figure 22:
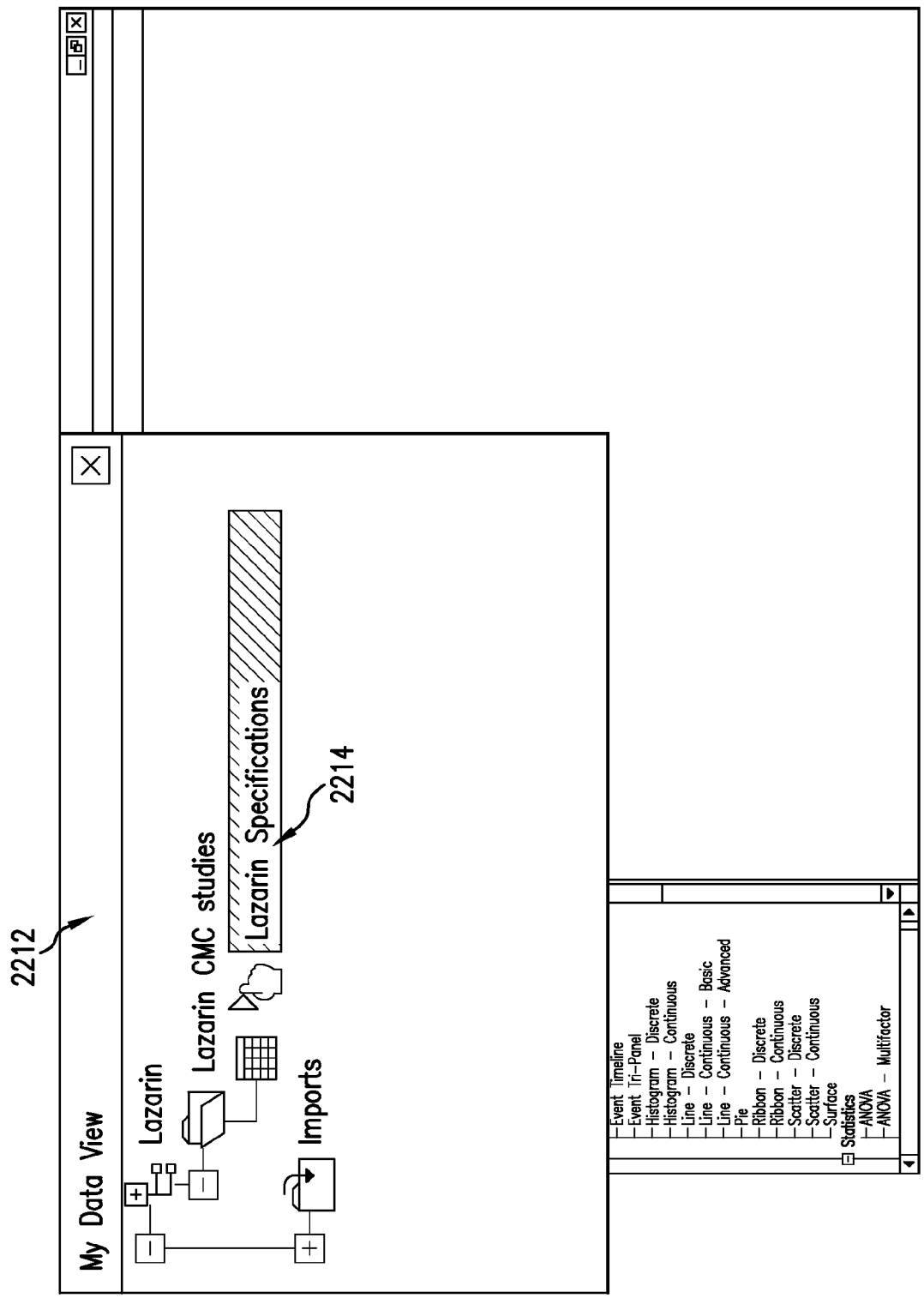
FIG. 22 is a screenshot of a user storing study results related to specifications for a drug product for the Chemistry, Manufacturing and Control (CMC) studies for the drug product of the manufacturing process of FIG. 15 in a window of a data analysis software platform according to one embodiment of the present invention.

FIG. 22 shows a user opening a window 2212 of a process intelligence software platform according to one embodiment of the present invention to access specifications 2214 for a pharmaceutical product from Chemistry, Manufacturing and Control (CMC) studies for the pharmaceutical product Lazarin of manufacturing process 1502.

Figure 23:
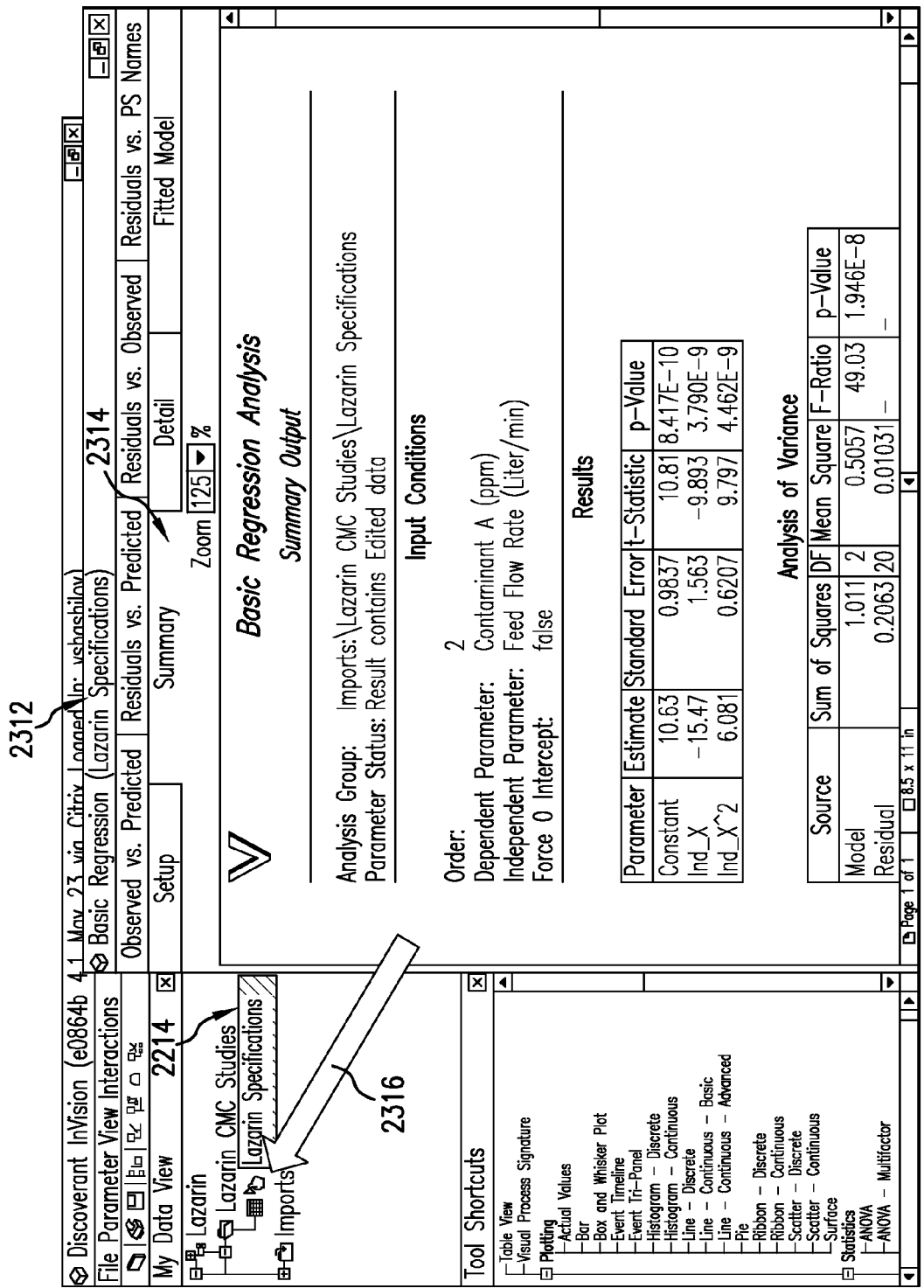
FIG. 23 is a screenshot of a tabbed window summary of the basic regression analysis that is part of the specifications for the pharmaceutical product accessed in FIG. 22.
Figure 24:
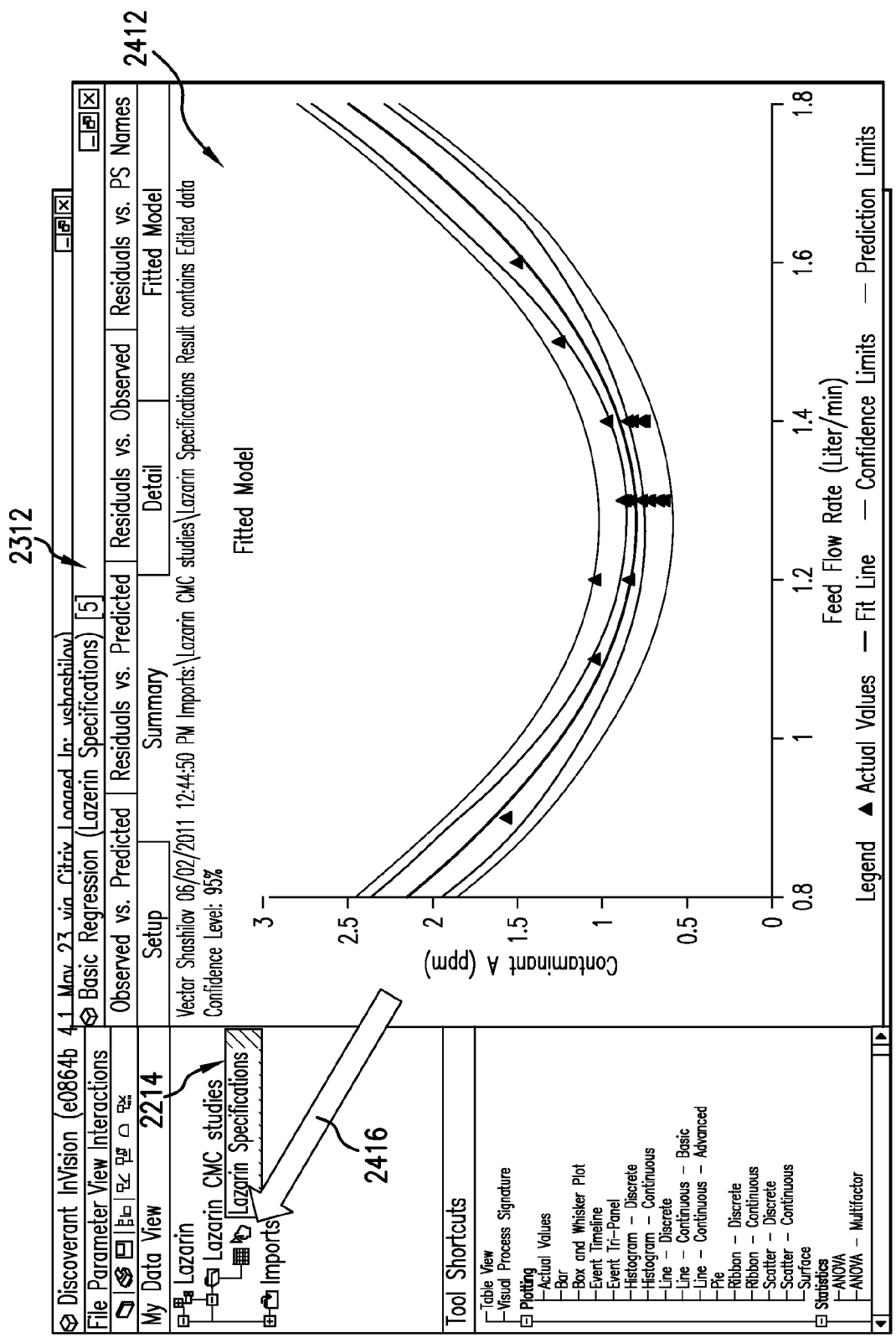
FIG. 24 is a screenshot of a tabbed window showing a fitted model for the amount of Contaminant A vs. feed flow rate for the pharmaceutical product that is part of the specifications for the pharmaceutical product accessed in FIG. 22.
Figure 25:
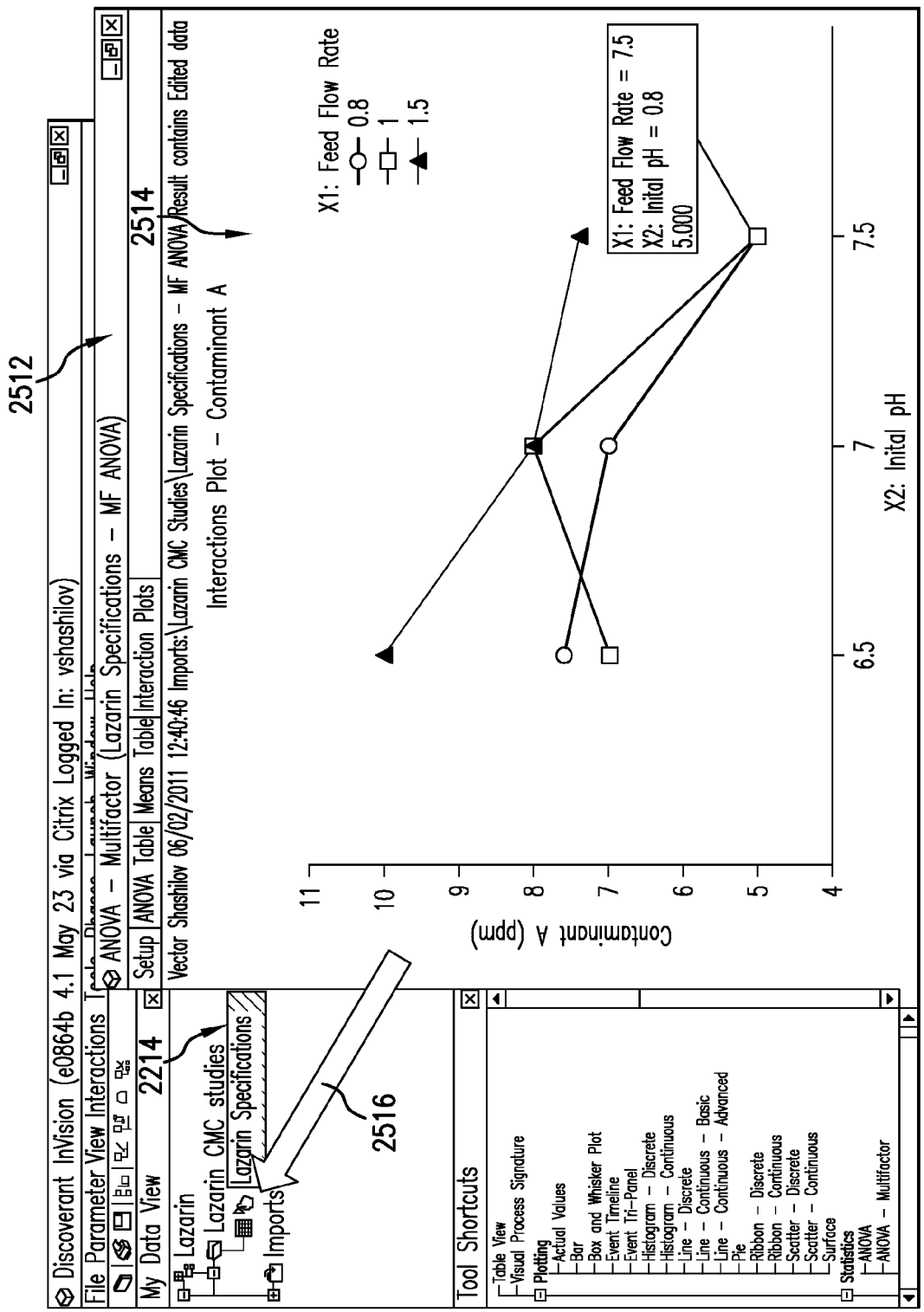
FIG. 25 is a screenshot of a tabbed window showing interaction plots of the amount of Contaminant A vs. initial and feed flow rate for the pharmaceutical product that is part of the specifications for the pharmaceutical product accessed in FIG. 22.
Figure 26:
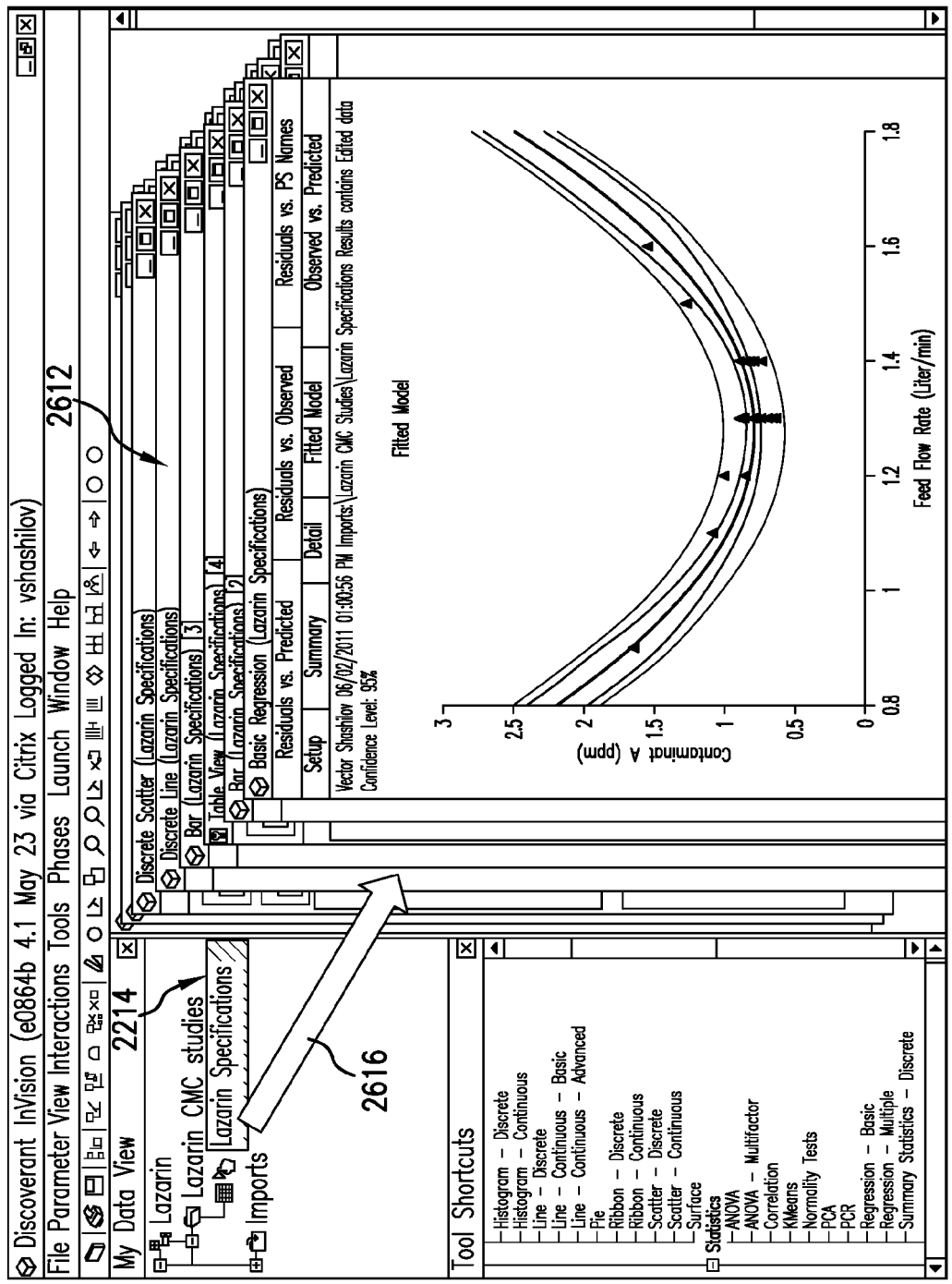
FIG. 26 is a screenshot of a series of windows including specifications for the pharmaceutical product accessed in FIG. 22.

FIG. 23 shows a window 2312 that includes a summary tabbed window 2312 of a basic regression analysis that is one of specifications 2214 as indicated by arrow 2314. FIG. 24 shows a fitted model tabbed window 2412 of window 2312 that displays a fitted model of the mount of Contaminant A vs. feed flow rate that is one of specifications 2214 for the pharmaceutical product as indicated by arrow 2414. FIG. 25 shows an interaction plots tabbed window 2512 of a window 2514 that displays interaction plot of the amount of Contaminant A vs. feed flow rate that is one of specifications 2214 or the pharmaceutical product as indicated by arrow 2516. FIG. 26 shows a series of windows 2612 including specifications 2214 for the pharmaceutical product as indicated by arrow 2614. FIG. 27 shows a CMC submission 2712 for the pharmaceutical product manufactured by manufacturing process 1502 that may be generated using a process intelligence software platform according to one embodiment of the present invention.

Figure 28:
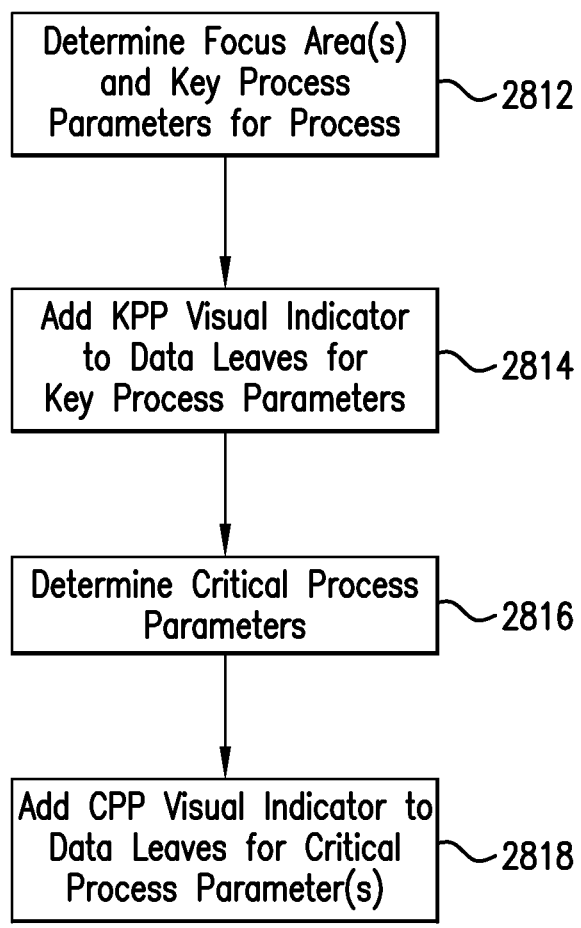
FIG. 28 shows a flowchart executed by a process intelligence software platform in displaying the results of a risk assessment by visualizing the Parameter Functional Categories on a manufacturing process according to one embodiment of the present invention.

FIG. 28 shows a method 2802 executed by a process intelligence software platform to visually display that process parameters of a process are key process parameters and that some of the key process parameters are critical process parameters. At step 2812, process parameters of a process are chosen as Key Process Parameters that are part of a focus group for risk assessment for the process. In some embodiments, a user chooses which process parameters are key process parameters. In other embodiments of the present invention, at least some of the process parameters may be determined to be key process parameters by the process intelligence software platform based on historical data for the process. For example, a list of key process parameters for the manufacturing process may be stored on the storage medium. At step 2814, the process intelligence software platform adds one or more visual indicators to the data leaves for each of the key process parameters to indicate that they are key process parameters. FIGS. 6 and 19 show examples of step 2814 being performed. At step 2816, the data analysis program determines the critical process parameters based on the total rank score(s) of the key process parameters of step 2812. Key process parameters having a total rank score that exceed a threshold value set by a user or set by the process intelligence software platform are determined by the process intelligence software platform to be critical process parameters. The value may be stored in a storage medium and retrieved by the process intelligence software platform in step 2816. At step 2818 the process intelligence software platform adds one or more visual indicators to the data leaves for each of the critical process parameters to indicate that they are key critical process parameters. Step 2818 may involves replacing one or more visual indicators indicating the process parameters are key process parameters with one or more visual indicators indicating that the process parameters are critical process parameters.

Although one order of steps 2812, 2814, 2816 and 2818 is shown in FIG. 28, at least some of these steps may be performed in a different order in some embodiments of the present invention. In some embodiments of the present invention, one or more of these steps may also be omitted. In some embodiments of the present invention, some of these steps may be combined and/or performed simultaneously.

Although the present invention has been described above in conjunction with pharmaceutical manufacturing processes, it should be noted that the method of the present invention may be used with other types of manufacturing processes. Examples of other manufacturing processes with which the methods of the present invention may be used include manufacturing process for chemical substances, chemical compositions, biological substances, biological compositions, medical devices, or any processes in which raw materials and/or intermediate materials are synthesizing and/or combined and transformed into products.

Although particular types of visual indicators are shown in the drawings, other types of visual indicators may also be used. The visual indicators may also have different colors, different shapes, different fonts, etc., to indicate a change in status of a process parameter or quality attribute.

One type of software that may be used to implement the methods of the present invention is the Discoverant® enterprise manufacturing intelligence (EMI) platform from Aegis Analytical Corporation. Discoverant® includes features such as: data analysis, dashboarding and reporting, data aggregation, capturing of paper record data, etc. Many of the features of Discoverant® and techniques that may be used with the present invention are described in U.S. Pat. No. 6,725,230 to Ruth et al., entitled "System, method and computer program for assembling process data of multi-database origins using a hierarchical display," issued Apr. 20, 2004, and the entire contents and disclosure of this patent are incorporated herein by reference.

Having described the many embodiments of the present invention in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

While the present invention has been disclosed with references to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method comprising:
displaying, on a visual display device, one or more process parameters of a process based on a hierarchical data structure, wherein one or more first visual indicators indicate that one or more of the one or more process parameters are one or more key process parameters;
performing a risk analysis on the one or more key process parameters to determine a total rank score for each of the one or more key process parameters; and
changing, on the visual display device, at least one of the one or more first visual indicators, associated with at least one of the one or more key process parameters having a total rank score exceeding a threshold value, to at least one of one or more second visual indicators that indicates that the at least one of the one or more key process parameters is a critical process parameter,
wherein the total rank score for each of the one or more key process parameters is based on a plurality of cause-and-effect quality scores.

2. The method of claim 1, wherein one or more names of one or more critical process parameters are shown as data leaves of the hierarchical data structure, and each data leaf of the data leaves includes one of the one or more second visual indicators that indicate that the data leaf is a critical process parameter.

3. The method of claim 1, wherein the process is a manufacturing process for a product.

4. The method of claim 3, wherein the product is a chemical composition.

5. The method of claim 3, wherein the product is a pharmaceutical product.

6. The method of claim 1, wherein the one or more first process parameters comprise an input material attribute.

7. The method of claim 2, wherein the hierarchical data structure comprises one or more data nodes, and wherein the one or more names of the one or more critical process parameters are shown as data leaves beneath one or more data nodes of the hierarchical data structure.

8. The method of claim 1, wherein the critical process parameter has a risk assessment score exceeding the threshold value.

9. The method of claim 1, wherein each of the plurality of cause-and-effect quality scores is associated with a corresponding one of the one or more key process parameters and a corresponding one of one or more key quality attributes.

10. A non-transitory computer-readable storage medium encoded with a plurality of computer-executable instructions that, when executed, perform a method comprising:
    displaying, on a visual display device, one or more process parameters of a process based on a hierarchical data structure, wherein one or more first visual indicators indicate that one or more of the one or more process parameters are one or more key process parameters;
    performing a risk analysis on the one or more key process parameters to determine a total rank score for each of the one or more key process parameters; and
    changing at least one of the one or more first visual indicators, associated with at least one of the one or more key process parameters having a total rank score exceeding a threshold value, to at least one of one or more second visual indicators that indicates that the at least one of the one or more key process parameters is a critical process parameter,
    wherein the total rank score for each of the one or more key process parameters is based on a plurality of cause-and-effect quality scores.

11. The non-transitory computer-readable storage medium of claim 10, wherein one or more names of one or more critical process parameters are shown as data leaves of the hierarchical data structure, and each data leaf of the data leaves includes one of the one or more second visual indicators that indicate that the data leaf is a critical process parameter.

12. The non-transitory computer-readable storage medium of claim 10, wherein the process is a manufacturing process for a product.

13. The non-transitory computer-readable storage medium of claim 12, wherein the product is a chemical composition.

14. The non-transitory computer-readable storage medium of claim 12, wherein the product is a pharmaceutical product.

15. The non-transitory computer-readable storage medium of claim 10, wherein the one or more process parameters comprise an input material attribute.

16. The non-transitory computer-readable storage medium of claim 11, wherein the hierarchical data structure comprises one or more data nodes, and wherein the one or more names of the one or more critical process parameters are shown as data leaves beneath one or more data nodes of the hierarchical data structure.

17. The non-transitory computer-readable storage medium of claim 10, wherein the critical process parameter has a risk assessment score exceeding the threshold value.

18. The non-transitory computer-readable storage medium of claim 10, wherein each of the plurality of cause-and-effect quality scores is associated with a corresponding one of the one or more key process parameters.

\* \* \* \* \*